United States Patent
Merlin et al.

(10) Patent No.: US 9,241,307 B2
(45) Date of Patent: Jan. 19, 2016

(54) METHOD AND APPARATUS USING AN ULTRA LOW POWER SIGNAL WITH SCHEDULED POWER SAVE MODES

(71) Applicant: QUALCOMM Incorporated, San Diego, CA (US)

(72) Inventors: Simone Merlin, San Diego, CA (US); Amin Jafarian, San Diego, CA (US); Alfred Asterjadhi, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 14/061,550

(22) Filed: Oct. 23, 2013

(65) Prior Publication Data
US 2014/0112229 A1 Apr. 24, 2014

Related U.S. Application Data

(60) Provisional application No. 61/719,357, filed on Oct. 26, 2012, provisional application No. 61/718,042, filed on Oct. 24, 2012.

(51) Int. Cl.
*H04W 52/02* (2009.01)
*H04B 1/3805* (2015.01)

(52) U.S. Cl.
CPC ...... *H04W 52/0209* (2013.01); *H04W 52/0229* (2013.01); *H04B 1/3805* (2013.01); *H04W 52/0216* (2013.01); *Y02B 60/50* (2013.01)

(58) Field of Classification Search
CPC .................. H04W 52/0209; H04W 52/0229
See application file for complete search history.

(56) References Cited

U.S. PATENT DOCUMENTS

| 6,389,010 | B1 | 5/2002 | Kubler et al. |
| 7,274,929 | B1* | 9/2007 | Banginwar ............... 455/418 |
| 2003/0107475 | A1 | 6/2003 | Bautista et al. |
| 2005/0136906 | A1* | 6/2005 | Azuma ..................... 455/418 |

(Continued)

FOREIGN PATENT DOCUMENTS

| GB | 2421153 A | 6/2006 |
| WO | WO-2010045488 A1 | 4/2010 |

OTHER PUBLICATIONS

Ansari J., et al., "Radio-Triggered Wake-ups with Addressing Capabilities for Extremely Low Power Sensor Network Applications," IEEE 19th International Symposium on Personal, Indoor and Mobile Radio Communications, PIMRC 2008, pp. 1-5.

(Continued)

*Primary Examiner* — Mohammad Anwar
(74) *Attorney, Agent, or Firm* — Knobbe, Martens, Olson & Bear, LLP

(57) ABSTRACT

Methods and stations for wireless communication are described herein. In some aspects, the station may include a processing circuit configured to process a first signal transmitted to the station, the first signal indicating a target wake up time when an activation signal is expected to be received. The station may further include a wake-up circuit configured to transition a first receiver to an awake state based on the indicated target wake up time. The first receiver is configured to receive the activation signal at the indicated target wake up time. The station may further include a second receiver configured to transition to an awake state based on the first receiver receiving the activation signal and receive a second signal while in the awake state.

30 Claims, 26 Drawing Sheets

(56) References Cited

U.S. PATENT DOCUMENTS

| | | |
|---|---|---|
| 2009/0247094 A1 | 10/2009 | Sakoda |
| 2010/0099358 A1* | 4/2010 | Kumar et al. ............... 455/41.3 |
| 2010/0238977 A1 | 9/2010 | Bulled et al. |
| 2011/0274021 A1 | 11/2011 | He et al. |
| 2012/0119902 A1* | 5/2012 | Patro et al. ................ 340/502 |
| 2012/0122511 A1 | 5/2012 | Antonio et al. |
| 2012/0250731 A1 | 10/2012 | Taghavi et al. |
| 2014/0050133 A1 | 2/2014 | Jafarian et al. |

OTHER PUBLICATIONS

Marinkovic S.J., et al., "Power Efficient Networking Using a Novel Wake-up Radio," 2011 5th International Conference on Pervasive Computing Technologies for Healthcare (PervasiveHealth) and Workshops, May 2011, pp. 139-143.

International Search Report and Written Opinion—PCT/US2013/066636—ISA/EPO—Jan. 30, 2014.

* cited by examiner

METHOD AND APPARATUS USING AN ULTRA LOW POWER SIGNAL WITH SCHEDULED POWER SAVE MODES

CLAIM OF PRIORITY UNDER 35 U.S.C. §119

The present Application for Patent claims priority to Provisional Application No. 61/719,357 entitled "Near Passive Receivers with Regular PS Mode and No ULP (AP Is Not Aware of the Receiver/Circuit Mode)" filed Oct. 26, 2012, and assigned to the assignee hereof. Provisional Application No. 61/719,357 is hereby expressly incorporated by reference herein. The present Application for Patent further claims priority to Provisional Application No. 61/718,042 entitled "Protocol for the Use of an Ultra Low Power Signal with Scheduled Power Save Modes" filed Oct. 24, 2012, and assigned to the assignee hereof. Provisional Application No. 61/718,042 is hereby expressly incorporated by reference herein.

RELATED APPLICATIONS

This application is related to U.S. Non-Provisional patent application Ser. No. 13/831,131, which is entitled "SYSTEM AND METHODS FOR LOW POWER WAKE UP SIGNAL AND OPERATIONS FOR WLAN" filed Mar. 14, 2013, the entirety of which is incorporated herein by reference.

BACKGROUND

1. Field

The present application relates generally to wireless communications, and more specifically to systems, methods, and devices for communicating very short paging messages for wireless receivers.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The receivers in a wireless network may consume a large amount of power during packet reception or while waiting to receive packets. Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

In one innovation, a wireless station for wireless communication comprises a processing circuit configured to process a first signal transmitted to the station, the first signal indicating a target wake up time when an activation signal is expected to be received. The station further includes a wake-up circuit configured to transmit a first receiver to an awake state based on the indicated target wake up time. The first receiver is configured to receive the activation signal at the indicated target wake up time. The station includes a second receiver configured to transition to an awake state based on the first receiver receiving the activation signal, and receive a second signal while in the awake state.

In another innovation, a method for wireless communication by a station is contemplated. The method includes processing a first signal transmitted to the station, the first signal indicating a target wake up time when an activation signal is expected to be received. The method further includes transitioning a first receiver to an awake state based on the indicated target wake up time. The method further includes receiving the activation signal at the indicated target wake up time by the first receiver. The method further includes transitioning a second receiver to an awake state based on the activation signal. The method further includes receiving a second signal by the second receiver.

In another innovation, a non-transitory computer-readable medium comprises code that, when executed, causes a wireless station to process a first signal transmitted to the station, the first signal indicating a target wake up time when an activation signal is expected to be received. The code further causes the station to activate a first receiver based on the indicated target wake up time and receive an activation signal at the indicated target wake up time by the first receiver. The code further causes the station to transition a second receiver to an awake state based on the activation signal, and receive a second signal by the second receiver.

In another innovation, a wireless station for wireless communication is contemplated. The station includes means for processing a first signal transmitted to the station, the first signal indicating a target wake up time when an activation signal is expected to be received. The station further includes means for transitioning a first receiver to an awake state based on the indicated target wake up time. The station further includes means for receiving the activation signal at the indicated target wake up time. The station further includes means for transitioning a second receiver to an awake state based on the activation signal, and means for receiving a second signal while the second receiver is in the awake state.

DETAILED DESCRIPTION

Figure 1:
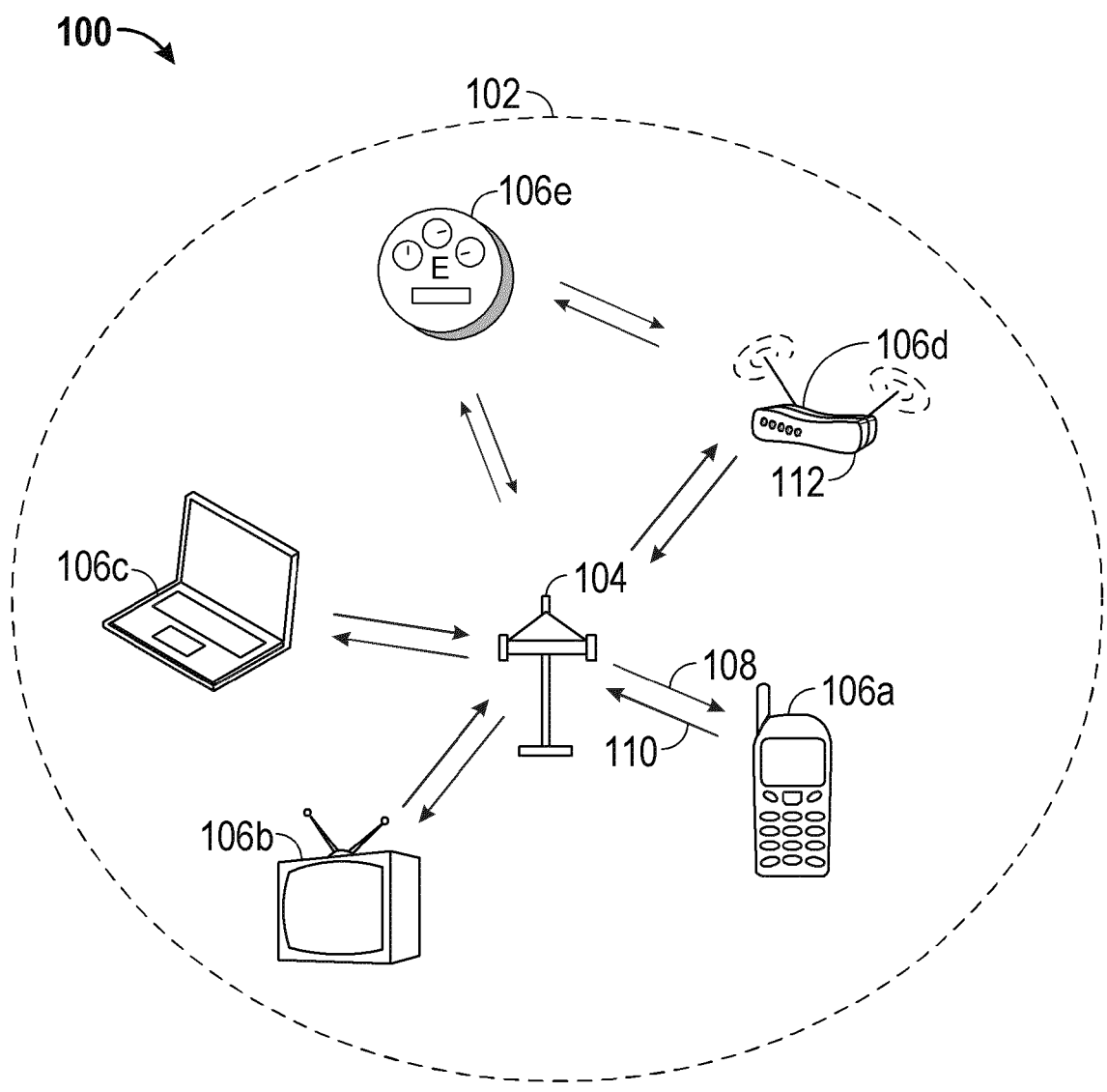
FIG. 1 shows an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless devices consume power when transmitting or receiving signals. Certain of the devices described herein operate in a plurality of states with differing capabilities and different levels of power consumption. For example, receivers consume more power in an awake state, during which time receiver circuits are activated and may receive incoming signals, or in a doze state during which time circuits are not activated and don't receive incoming signals. Reducing the amount of time that receivers are in an awake state and waiting to receive incoming signals reduces power consumption.

Wireless devices employ various power management modes to manage operation states. These power management modes include "Active", where the device is always in an Awake state, "Normal Power Save", where the device can be either in an Awake state or a Doze state, or "Power save with ultra low power" (PS-ULP), where the device can be in Awake state or a Low Power state which may save more power than when the device is in a Doze state. While the implementations described herein that relate to using a paging message that may be received by a ultra-low power receiver (that is, a second receiver in a device) may be applicable to many different power modes of operating a wireless device, for clarity of the disclosure, the examples of certain implementations described herein generally relate to using a Normal Power Save mode.

A simple way to reduce the time that a receiver STA is awake is to transition the receiver to doze state for most of the time, except for those short intervals of time agreed with the transmitter when signals may be sent from the transmitter to the receiver. This is neither flexible nor efficient because in typical applications, the traffic pattern is unpredictable. The agreed awake time may not match the traffic pattern, so some awake times may not correspond to transmit times. There may also be times when transmitted signals are not received because they are transmitted outside of the agreed awake time.

A more flexible and effective approach is for the receiver to doze until a trigger event triggers the receiver to transition to awaken. In some implementations, the trigger event is generated when a circuit receives a wake-up wireless signal. Power consumption is reduced in cases where the wake-up signal is configured so that circuitry that receives the wake-up signal is a simple and low power receiver. The low power receiver (sometimes referred to as a "wake-up receiver") is configured to consume less energy than the regular data receiver to reduce overall power consumption of the wireless device.

In one implementation, a STA's regular data receiver is in doze state. A transmitter (e.g., of an AP or other STA) wirelessly sends a signal to the STA's low power receiver. The STA's low power receiver receives the wireless signal and performs some action. For example, the action may be to wake-up the STA's regular data receiver (either immediately or at a specified time or time delay) to an awake state such that the STA's regular receiver can receive data. In some cases, the STA then sends a message to inform an AP or another STA that it is awake. Then, an AP or STA may send data to the STA's regular receiver, and it is received and processed by the STA.

For some devices, the wireless signal received by the low power receiver (sometimes referred to as an "ultra low-power receiver" or "radio frequency (RF) wake up circuit") may be a short paging message ("page"), wake-up packet, or an ultra low power (ULP) message. In some implementations in this disclosure, protocols are identified for using such signals or pages to conserve power. This may be in the context of a plurality of power save mode protocols including but not limited to regular Power Save (PS) protocol and Unscheduled Automatic Power Save Delivery (U-APSD). Implementations of the timing of the pages, potentially with respect to a beacon, related setup signaling, and page formats are also disclosed.

This disclosure identifies a protocol for the use of ULP messages in conjunction with regular PS mode protocol, which uses beacons and PS-Polls/trigger frames, depending on whether U-APSD is used. This may be in the context of a plurality of power save mode protocols including but not limited to PS-ULP, regular PS protocol, and U-APSD. This disclosure describes potential timing of the ULP messages with respect to beacons, and related setup signaling. This disclosure also describes state transitions of the STA depending on some combination of initial state, power saving mode (for example, PS-ULP mode), and signals received or transmitted.

There may be multiple formats of the short page message including but not limited to 1 MHz PHY preamble, 2 MHz PHY preamble, or short control frame with various transmission rates. Different formats may be suitable for different scenarios. The STA may ask the AP to use a specific one as a paging message. The format of the short paging signal is agreed between AP and STA at the association or later through a management frame exchange.

In such implementations, the format, content, and definition of the transmitted and received ULP messages that are received by the low power receiver of a wireless device are known by the transmitting and receiving wireless devices so that the receiver can identify and parse incoming ULP messages. In some implementations, the AP or other STA would send a ULP message at certain target times and/or time intervals. In some implementations, the receiving STA can use a simple and low power receiver circuit designed to receive certain ULP messages of expected configurations and content. Receiving STAs may be further configured to reduce power consumption by a power saving scheme that places the wake-up circuit different operational states, such as ultra low power, doze, or awake. In some cases, these states may correspond to the states employed by the STA's regular data receivers and transceivers.

For some implementations, power is conserved by maximizing the time analog and digital circuits are in an off or sleep. For some implementations, different circuits within the wireless device may be in different states. For example, the regular data receiver may be in doze state, while a ULP receiver may be awake to receive ULP messages.

For some implementations, the RF wake-up circuit selectively receives a particular RF signal structure. When detected, the RF wake-up circuit activates the STA's regular data receivers and transceivers. These regular receivers may contain analog and/or digital circuitry.

In some implementations, state transitions are not instantaneous. For example, when the transceiver is powered on, it may take several hundred microseconds to wake-up a primary receiver, largely due to phase locked loop (PLL) convergence time, loading of calibration coefficients, and time to load registers. When the transceiver is fully powered off, wake-up time could take several milliseconds. In some implementations, sufficient time is allocated and medium reserved to allow for state transition time.

In some implementations, the low-power receiver is a separate module from the wireless device's primary transceiver. In other implementations, they are in the same module.

For some implementations, a STA operates in Active mode, with a single Awake state. For other implementations, a STA operates in regular PS mode, with two operational states: Awake and Doze.

For some implementations, a STA operates in Power Save-Ultra Low Power (PS-ULP) mode. For some implementations of STAs operating in PS-ULP mode, the STA may transition among three operational states: Awake, Doze, or ULP. Transitions from Doze state to Awake state, or Awake state to Doze state may use the existing PS mode transition conventions. When transitioning from Doze state to Awake state, the STA may send a PS-Poll or a trigger frame to an AP and indicate it's ready to receive data. When transitioning from Awake state to Doze state, the AP indicates that the STA may go to sleep. In some implementations, the AP sets a More Data parameter to false. In other implementations, the AP sets an End of Service Parameter to true. Similar mechanisms may be employed in other implementations. This disclosure describes various implementations associated with transitions from doze state to ULP state, from ULP state to awake state, from ULP state to doze state, and from awake state to ULP state.

In some implementations, the ULP circuit may not be active all times; ULP circuits typically need to be cycled off periodically. This disclosure describes protocols that enable the AP and STA to coordinate and communicate state transitions. Some aspects of these protocols are integrated with existing power save mode mechanisms. This reduces changes to existing specifications.

In some implementations, pages or ULP messages coexist with beacons. They may be repeated with the same or a different duty cycle as beacons. In other implementations, pages may replace beacons.

In some implementations, pages or ULP messages include duration parameters that can be used to reduce contention. For example, timeslots can be dedicated to one or several STAs for uplink and/or downlink transmissions during the period of duration, or other purposes during the duration set, during the wake-up protocol.

In some implementations, pages or ULP messages instruct the wireless device to transition the primary receiver to sleep. This reduces battery consumption, and may be used when the AP does not have any BUs for the STA.

Wireless devices including APs may send pages or ULP messages for timing synchronization with one or more devices including STAs. For example, a page with a "no data" message can be sent for synchronization.

Pages sent between wireless devices may also provide information about the communications medium, changes in protocol, changes in identification parameters, changes in the target beacon transit time (TBTT), or other similar information.

In such implementations, the page format, content, and definition of transmitted pages are known by the transmitting and receiving wireless devices so that the receiver can identify and parse incoming pages. In some implementations, the AP or other STA would send a page at certain target times and/or time intervals. In some implementations, other messages may not be sent to the STA at that time. By sending known and agreed to short paging messages at target times, the receiving STA can use a simple and low power receiver circuit designed to receive certain pages of expected configurations and content. Receiving STAs may be further configured to reduce power consumption by a power saving scheme that places the wake-up circuit in a doze or in an awake state. In some implementations, such doze and awake states may be similar to, or the same as, doze and awake states employed for a STA's regular data receivers and transceivers.

In some implementations, the page received by the low power receiver may be an NDP Control frame consisting of a PHY preamble only. The page can include wake-up information in a SIG field of the frame. In other implementations, the page may be a MAC frame. MAC frame examples include a regular ACK with More Data set to 1, a QoS-CF-ACK frame, or another short MAC frame. These, and similar short message lengths, and well defined, finite set of pages, enable decoding circuitry with simpler logic, less memory and less expensive clocks than is possible with longer message, less well defined, or a larger set of inputs. Such circuitry may be optimized to receive and decode the pages in implementations optimized to reduce power consumption, use less memory, and/or a simpler clock than the primary STA receiver that receives beacons and BUs. Such implementations reduce signal length and receive power consumed, thereby increasing battery life. The circuitry in a STA to receive and decode pages may be implemented as a separate receiver integrated with other circuitry.

In some implementations, pages include duration parameters that can be used to reduce contention. For example, timeslots can be dedicated to one or several STAs for uplink and/or downlink transmissions during the period of duration, or other purposes during the duration set, during the wake-up protocol.

In some implementations, pages instruct wireless device to transition the primary receiver to sleep. This reduces battery consumption, and may be used when the AP does not have any BUs for the STA.

Wireless devices including APs may send pages for timing synchronization with one or more devices including STAs. For example, a page with a "no data" message can be sent for synchronization.

Pages sent between wireless devices may also provide information about the communications medium, changes in protocol, changes in identification parameters, changes in the target beacon transit time (TBTT), or other similar information.

For some implementations of wireless or wired networks of devices, that may include sensor networks, there may be a class of applications with low duty cycle up load (UL) and down load (DL) traffic in combination with strict latency requirements in receiving DL data. For example, it may be necessary to respond to an alarm or a command with under a second of latency. Regular PS mode, which uses a beacon to indicate DL data, may not be efficient enough, even though 802.11ah defines a short beacon of 560 us+>13B+TIM®150 Kbps>1.5 ms. The TIM size is not bounded and additional fields/IEs may be present.

For some implementations, a low power receiver and enhanced paging protocols may enable optimized receiver operations. The protocol may coexist with existing 802.11 power save operation modes, and may be built on top of existing 802.11ah mechanisms, such as Target Wake up Time with synch frame.

For these implementations, the STA agrees with the AP on a Target Wake up Time. The STA also indicates to the AP whether at the TWT the STA would like to receive a short paging message indicating whether there are any Buffered Units at the AP. The STA may send a management frame to the AP including the above requests and any other parameters that may be required, such as a suggested time for the TWT. If the STA requested that short pages are sent, and if data is pending, the AP sends a very short paging message directed to the STA, at a Target Wake up Time. This may extend to a groupcast if the same TWT is assigned to more than one STA. For a STA that receives this message, the STA has three options. The first option is to act as if it received a TIM indicating Buffered Units (BUs), and send a PS-Poll or trigger frame. The second option is to read the next short beacon and proceed as in regular Power Save (PS). The third option is to wait for a further poll message from the AP after a certain time.

For these implementations, the very short paging message is an NDP control frame. The control frame includes a (partial) AID of the STA being paged. The control frame also includes a bit indicating whether there is a BU for the STA. In some cases, the control frame includes synchronization information such as a plurality of LSBs of timestamp. The pages are received at TWTs, and beacons at TBTTs. Pages are optimized RX ON 560 us. In regular PS mode, the STA decodes a short beacon.

By using pages, the STA only needs to decode a short NDP control frame. For some implementations, it takes less than one third as long to decode NDP control frames than beacons. For example, over 1.5 ms to decode a short beacon and more than three times as short a time to decode an NDP control frame.

In some implementations, an optimized receiver receives paging messages instead of a full receiver. Examples where this is possible are cases where the pages are well defined. A PHY receiver may be optimized to detect and decode NDP frames only. There may be limited operations upon reception, with a simple MAC.

In some implementations, the data duty cycle will be low. In some implementations, it is likely that at any point in time, only one STA needs to be paged. In some implementations, different STAs may be assigned different or nearby TWTs. In some implementations, multiple STAs may be assigned the same TWT. A group AID may be defined to page multiple STAs. Multiple NDPs may be sent in sequence targeting one STA each.

One advantage of the methods and systems described in this disclosure is that they optimize download delivery. Existing Target Wake Time (TWT) with synch frame approaches, such as those approved by IEEE, focus on improving upload access.

The proposed methods and systems in this disclosure enhance existing TWT with Synch frame concepts already approved by IEEE. Existing approved approaches benefit UL access more than DL delivery. For TWT, the STA and AP agree on a wake up time for UL and DL data exchange. The synch frame sent by the AP at the TWT slot boundary to enable faster UL medium access, in existing approaches. This disclosure extends the existing mechanism to optimize download delivery also.

In some implementations, the AP sends a synch frame at the slot boundary or target wake time of the STA, if the channel is idle and the STA requested to receive a synch frame to quickly synch to the medium or the STA requested to receive a notification of downlink buffer units or a check beacon. The synch frame is an NDP control frames that includes in SIG: (partial) AID of the target STA, control information (BU present, read beacon, synch only). After sending an NDP synch frame, the AP need not send data or management frames to the STA before the STA is in active mode.

For some implementations, a 1-2 MHz PHY preamble SIG field of NDP synch frame may include a Partial AID (hash of AID and BSSID of about 6-13 bits). It may also include an info field with bits for pending BUs, and read beacon. Both bits are set to 0 for Synch only for UL data. When pending BU is 0 and read beacon is 1, the STA is instructed to read the full beacon. When pending BUs is 1 but read beacon is 0, the STA is informed that BUs are available, so send a PS-Poll or wait for data. When both bits are set to zero, the STA is instructed to read the TIM beacon.

For some implementations, the number of bits for CRC, Tail, MAC-NDP, Type, Partial-AID, and Info/reserved is 4, 6, 1, 4, 6-13, and 8-15, respectively. For other implementations, the number of bits for CRC, Tail, MAC-NDP, Type, Partial-AID, and Info/reserved is 4, 6, 1, 4, 6-13, and 20-27, respectively.

For some implementations, replacing beacons with pages will reduce energy assumption. An evaluation may start by assuming receive power of 100 mW, sleep power or 10 mW, clock drift of 20 ppm, and no BU by the STA still checks to guarantee latency. By replacing a short beacon of 16 bytes at MCS0 rep2 (1.4 ms) with a short page of 240/560 us, and assuming the same period for the page option as used for the beacon baseline, the paging framework consumes significantly less energy. Optimized receivers may be designed to further lower energy consumption. With an optimized receiver, very significant energy saving, especially at low latencies is possible, estimated for a 5-10× battery life improvement at 100 ms latency, and 2-5× battery life improvement at 2 s latency.

In some implementations, the AP uses Point Coordination Function (PCF) Interframe Spaces (PIFS) to send a synch frame at the slot boundary or target wake time of the STA, if the STA requested to receive a synch frame to quickly synch to the medium or the STA requested to receive a notification of downlink buffer units or a check beacon. The AP aborts transmission of the synch frame after a time T after the target wake time of the STA. The synch frame is an NDP control frames that includes in SIG: (partial) AID of the target STA, control information (BU present, read beacon, synch only). After sending an NDP synch frame, the AP need not send data or management frames to the STA before the STA is in active mode.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

The AP 104 may transmit a short page message signal (or simply a "page"), via a communication link such as the downlink 108, to other nodes STAs 106 of the system 100, which may help the other nodes STAs 106 to synchronize their timing with the AP 104, or which may provide other information or functionality. Such pages may be transmitted periodically. In one aspect, the period between successive transmissions may be referred to as a page superframe. Transmission of a page may be divided into a number of groups or intervals. In one aspect, the page may include, but is not limited to, such information as the time to wake-up the receiver, the time to put a receiver to sleep, or duration information, timestamp information to set a common clock, a peer-to-peer network identifier, a device identifier, capability information, a page superframe duration, transmission direction information, and/or reception direction information, some of which are described in additional detail below. Thus, a page may include information both common (e.g. shared) amongst several devices, and information specific to a given device. Short page message signals may also be referred to as low power signals, ultra low power signals, or messages, or packets.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Accordingly, in certain wireless communication systems 100, the AP 104 may transmit paging messages to a plurality of STAs 106 that are in a power save mode, the paging messages indicating whether or not there is data buffered at the AP 104 for the STAs 106. The STAs 106 may use this information to determine when to transition to an awake state or a doze state. For example, if an STA 106 determines it is not being paged, it may enter a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure.

In some aspects, paging messages may include a bitmap (not shown in this figure), such as a traffic identification map (TIM). In certain such aspects, the bitmap may include a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state) to be able to receive Buffered Units (BUs) that the AP 104 has for that particular STA. Accordingly, the size of the bitmap may be directly proportional to the number of STAs 106 in the wireless communications system 100. Therefore, a large number of STAs 106 in the wireless communications system 100 may result in a large bitmap.

In some aspects, STAs 106 that sleep for a long time may not wake up to read incoming TIM messages. For example, a STA 106 may be configured to sleep through one or more TIM messages in an extended sleep mode. In this case, the STA 106 may previously have advertised to the AP 104 that the STA 106 may not read any TIM messages. Accordingly, the AP 104 may not include the corresponding identifiers in the TIM message. In various implementations, the STAs 106 can notify the AP 104 that they may not wake up for one or more TIM messages (e.g., that they are operating in the aforementioned power saving mode) using a control message, or immediately during association.

For STAs 106 that have notified the AP 104 in this manner, the AP 104 may not include identifiers in the TIM message, even when it has BUs intended for them. STAs 106 may claim their BUs by sending a PS-Poll at any time to the AP 104. In an implementation, AP 104 may immediately send the BU in response to the PS-Poll. In another implementation, the AP 104 may respond to the PS-Poll with an ACK, and deliver the BU at a later time. In yet another implementation, the AP 104 may not immediately respond (neither with ACK nor with BU) to a PS-Poll. The AP 104 may instead reply with a Cumulative ACK frame sent after a given scheduled time after the TIM message.

In various implementations, the STA 106 can specify the waiting time to deliver the BU via the PS-Poll (for a dynamic indication), an association request, a probe request, and/or another management frame sent to the AP (for a static indication). In other implementations, the AP 104 can specify the waiting time to deliver the BU via an acknowledgement (ACK or ack) frame, a TIM element (for a dynamic indication), a beacon, an association response, a probe response, or other management frames sent to the STA 106 (for a static indication). The STA 106 may go to sleep for the waiting time duration. The STA 106 may acknowledge correct reception of the BU by sending an ACK. The STA 106 may then go back to sleep.

Figure 2:
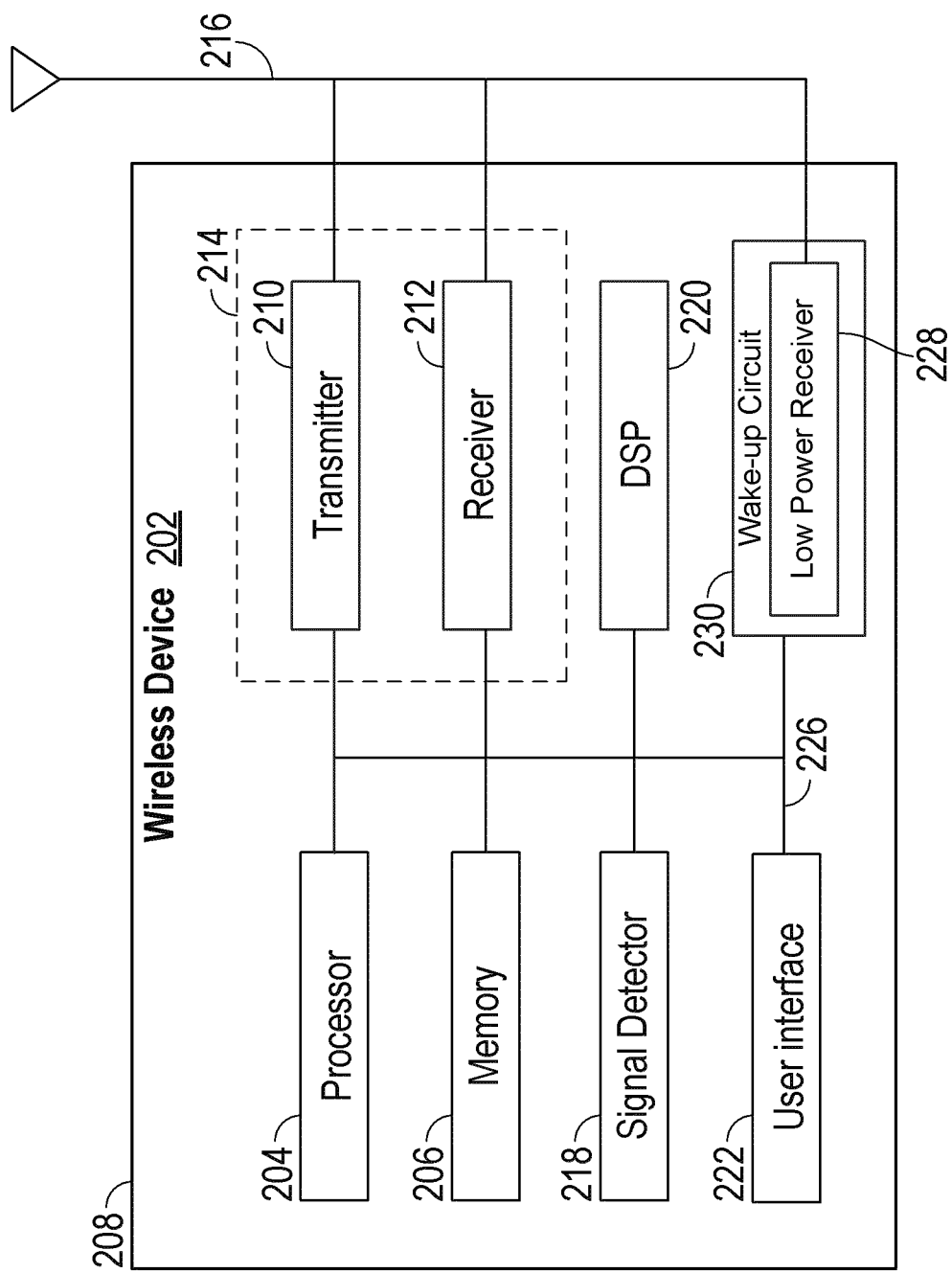
FIG. 2 illustrates a block diagram of an example of a wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise \one of the STAs 106, or one of the relays 320 and/or 330.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake-up circuit 230 comprising a second, low power receiver 228. In one aspect, the low power receiver 228 may be configured to consume power that is lower than power normally consumed by the receiver 214 during operation. For example, the low power receiver 228 may be configured to consume on the order of 10×, 20×, 50× or 100× (or more) less power when operating as compared to the transceiver 214. In one aspect, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques. A STA 106 that is a wireless device 202 having the low power receiver 228 may be referred to herein as a low power receiver STA 228. Other STAs that may not include the low power receiver 228 or may be operating in a mode where the transceiver 214 is activated may be referred to herein as a STA 106.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise a STA 106, and may be used to transmit and/or receive communications. That is, an STA 106 may serve as a transmitter or receiver device. Certain aspects contemplate signal detector 218 being used by software running on memory 206 and processor 204 to detect the presence of a transmitter or receiver.

A receiver of a STA 106, such as receiver 212, may consume a large amount of power during reception of packets from the AP 104 or another STA or while waiting for a packet to be received. The amount of power that is consumed by the STA 106 may be reduced if the receiver is shut off for short intervals of time. For example, the receiver of STA 106 may be shut off or turned on at times agreed upon by the AP 104 and the STA 106. However, shutting off the receiver at an agreed upon time may not be flexible or efficient. The traffic pattern to and from the AP 104 may not be predictable such that the agreed upon time may occur when no packets are ready to be transmitted to the STA 106. Likewise, packets may be ready to be transmitted to the STA 106 when the receiver of the STA 106 is shut off.

In some implementations, some of the drawbacks described above may be minimized by including a second receiver in the STA 106. The second receiver may be a low power receiver compatible with WLANs (e.g., the IEEE 802.11 protocol, etc.). For example, the low power receiver of the STA 106 may be able to communicate with the AP 104 (e.g., receive packets from the AP 104). As another example, the low power receiver of the STA 106 may be able to communicate with other STAs, including those that are not associated with the STA 106. As is described herein, the use of a low power receiver may reduce energy consumption.

Generally, a STA 106 (for example, wireless device 202) may include an RF wake up receiver that wakes up the receiver 212 from a sleep or doze state when a message is received from the AP 104 or another STA. The RF wake up receiver may reserve medium for the receiver 212 to wake up and start receiving data. In further embodiments, the RF wake up receiver may be turned on and off based on a schedule agreed upon with the AP 104. This may further reduce energy consumption.

In an implementation, the STA 106 may be in one of several states for a given power management (or power saving) mode the STA 106 is operating in. For example, the states may include an active state in which the STA 106 is "awake" and the STA 106 can receive (on its main signal receiver 212), process and transmit signals. In other words, in an active state, the receiver 212 of the STA 106 and any associated analog and/or digital circuits may be turned on such that the STA 106 can receive, process and transmit signals. When the STA 106 is in a PS mode, the STA 106 may be in an awake state or a doze state. In the doze state, the STA 106 cannot receive signals on the main signal receiver 212 and less power is consumed. To receive signals, the STA 106 may be placed in an awake state and typically it periodically awakens (for example, every 100 ms to check for beacons). In some implementations, the STA 106 can also operate in a PS low-power mode (PS-LP mode). In the PS-LP mode, a main signal receiver of a wireless device (for example, receiver 212 of device 202) does not normally awaken periodically, but instead the main receiver is caused to wake-up when a low-power receiver 228 receives a signal indicating to wake up the main receiver 212. Accordingly, in some implementations of a PS-LP mode, the states of the STA can be awake, doze, or low-power (where a STA does not wake-up periodically but instead is awoken by a signal received at a low-power receiver. In other implementations of a PS-LP mode, the states of the STA can be awake or low-power, and not have a doze state.

In a PS mode, the STA 106 may be in an awake state (e.g., the receiver 212 and any associated analog and/or digital circuits are turned on) or may be in a doze state (e.g., the RF wake up receiver is turned on, but the receiver 212 and any associated analog and/or digital circuits are turned off). An AP may not know if a wireless device is operating in a PS-LP mode. For example, legacy devices may not include a low-power receiver. Accordingly, communication protocols may be used that can make use of a PS-LP mode for devices that have such a capability, and also accommodate legacy devices to operate as they normally would.

In some implementations, when a wireless device is in a legacy power saving mode, the wireless device be operational in one of several operational modes. For example, the operation modes may include legacy PS-Poll, unscheduled automatic power save delivery (U-APSD), scheduled automatic power save delivery (S-APSD), tunneled direct-link setup (TDLS) peer power save mode, and/or IEEE 802.11ah target wake times (TWT).

The legacy PS-Poll operation mode may include the STA 106 listening for a traffic indication map (TIM) transmitted by an AP 104. If the TIM indicates that there are bufferable units (BUs), the STA 106 may transmit a PS-Poll to the AP 104. The AP 104 may respond by sending data immediately or an acknowledgement followed by data at a later time. The AP 104 may also indicate if there are more BUs available.

The U-APSD operation mode may be similar to the PS-Poll operation mode. The STA 106 may transmit a "trigger frame," which may include any data frame (e.g., including QoS-Null) with an AC indication. The AP 104 may respond by transmitting data at a start of a service period and until the service period ends.

The S-APSD operation mode may include the STA 106 and the AP 104 agreeing on a scheduled delivery time of packets. At the agreed upon time, the AP 104 may send a frame (e.g., a CF-Ack) to check if the STA 106 is awake. If the STA 106 is awake, the AP 104 may start a service period as described above with respect to the U-APSD operation mode.

The TDLS peer power save mode may include one or more STAs that agree upon a scheduled time at which both STAs are awake. If data is exchanged, STAs may go to sleep or doze when data indicates that a service period has ended.

The IEEE 802.11ah TWT operation mode may include a STA 106 that agrees with the AP 104 on a periodic window of time for uplink and/or downlink data transfer. The STA 106 may be sleeping or dozing outside of the periodic window of time.

The low-power state described above may also be referred to as an ultra-low power state. Accordingly, in a power save ultra-low power (PS-ULP) state (e.g., a PS-ULP mode), the STA 106 may be in an awake state, in a doze state, or in an ultra-low power (ULP) state (e.g., the low power receiver and/or the low power wake up receiver are turned on, but the RF wake up circuit, the receiver 212, and any associated analog and/or digital circuits may be turned off). As described herein, it is assumed that the STA 106 is operating in the PS-ULP state.

In an implementation, in the PS-ULP mode, the STA 106 may transition from the doze state to the awake state, from the awake state to the doze state, from the doze state to the ULP state, from the ULP state to the awake state, from the ULP state to the doze state, and/or from the awake state to the ULP state.

The STA 106 may indicate to the AP 104 that it has transitioned from the doze state to the awake state by transmitting a PS-Poll or a trigger frame to the AP 104. The PS-Poll and/or the trigger frame may indicate that the STA 106 is ready to receive data.

The STA 106 may transition from the awake state to the doze state upon receiving a message from the AP 104 that indicates that the STA 106 can go to sleep. For example, the AP 104 may transmit a parameter indicating that additional data will not be transmitted to the STA 106 and/or the AP 104 may transmit a parameter indicating that the service period has ended. In an implementation, the AP 104 may assume the STA 106 transitioned into the doze state upon transmitting the parameter(s).

In an implementation, the STA 106 and the AP 104 may agree upon a period of time (e.g., a target ULP time (TUT) or target wake up time) during which the STA 106 may be in the ULP state. During the TUT, or target wake up time, the AP 104 may transmit one or more ULP messages to the STA 106. In some implementations, the STA 106 may indicate a preferred setting (e.g., based on its wake up time) by exchanging timing parameters with the AP 104.

The TUT may be defined relative to a time already agreed upon in the context of an S-APSD operation mode or an IEEE 802.11ah TWT operation mode. For example, the time agreed upon in the context of the S-APSD operation mode or the IEEE 802.11ah TWT operation mode may indicate a service period during which the AP 104 may transmit data to the STA 106 (e.g., a period during which the STA 106 is in an awake state). In some implementations, the TUT may occur before or after the service period. In other implementations, the TUT may overlap with the service period. While the TUT and the service period may overlap, the AP 104 may assume that the STA 106 is in the ULP state for the duration of the TUT.

If the AP 104 has BUs available for the STA 106, the AP 104 may transmit a ULP message during the TUT. In some implementations, the ULP message may be transmitted via a unicast transmission directed toward the STA 106. In other implementations, the ULP message may be transmitted via a groupcast transmission directed toward the STA 106 and other STAs. The ULP message may cause the STA 106 to transition from the ULP state to the awake state by the start of the next service period (e.g., the service period agreed upon in the context of the S-APSD operation mode, the IEEE 802.11ah TWT operation mode, etc.). In other words, the ULP message may function as a wake up signal. If the ULP message is received during a TUT that overlaps with the service period, the STA 106 may immediately or nearly immediately transition into the awake state.

In some implementations, the AP 104 may ensure that the STA 106 transitioned into the awake state before transmitting any data packets during the service period. In an implementation, the AP 104 may send a frame QoS and a CF-Ack that indicates that the service period has not ended, and expect an acknowledgement from the STA 106. The STA 106 may then stay awake and wait for data packets to be received from the AP 104. In another implementation, the AP 104 may expect to receive a PS-Poll or a trigger frame from the STA 106 to indicate that the STA 106 is in the awake state. For example, the ULP message may act as a TIM and the STA 106 may operate as in a regular power saving mode known to one of skilled in the art.

In other implementations, the AP 104 may assume that the STA 106 is in the awake state starting a predetermined time after the ULP message is transmitted (e.g., 10 ms, 100 ms, etc.).

If the AP 104 has no BUs available for the STA 106, the AP 104 may still transmit a ULP message during the TUT. The ULP message may indicate that there is no data available for the STA 106. The ULP message may also allow for synchronization, such that the AP 104 and the STA 106 could schedule a new TUT and/or service period. The ULP message may also allow the STA 106 to transition from the ULP state to the doze state at an earlier time (e.g., before the end of the TUT).

If the AP 104 does not transmit a ULP message during the TUT, the STA 106 may remain in the ULP state until the TUT ends. After the TUT ends, the STA 106 may transition into the doze state. If the TUT overlaps with the service period, the STA 106 may transition into the awake state after the TUT ends.

In some implementations, the STA 106 may transition from the awake state to the doze state after the service period ends. In other implementations, the STA 106 may transition from the awake state to the ULP state after the service period ends if the STA 106 indicates that the STA 106 will always be in the ULP state when not in the awake state.

In other implementations, the STA 106 and the AP 104 may agree upon a given schedule, such as like in the context of the S-APSD operation mode or the IEEE 802.11ah TWT operation mode, and the STA 106 may indicate whether it will be in the active state or the ULP mode during the scheduled time. If the STA 106 is in the ULP mode, the AP 104 may behave as described above (e.g., the AP 104 may transmit a frame QoS and CF-Ack after the ULP message and expect an acknowledgement from the STA 106 or the AP 104 may expect a PS-Poll or trigger frame from the STA 106).

Figure 3A:
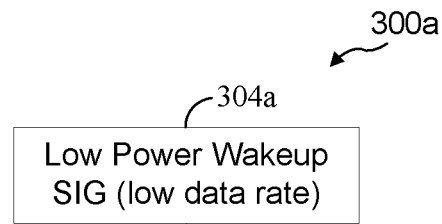
FIG. 3A shows an example of a low power wake up signal, in accordance with an implementation of the invention.

FIG. 3A shows a possible structure for a low power wake-up signal 300a. The wake-up signal 300a may be a single-phase signal 304a that carries an encoded signal. The wake-up signal may be transmitted using on-off keying, frequency-shift keying, or the like. For example, if using something similar to on-off keying, the wake-up signal 300a may be a sequence represented as zeros and ones. When the wake-up circuit 230 and low power receiver 228 detect a particular sequence of zeros and ones, the wake-up circuit 230 may trigger turning on the transceiver 214. The wake-up circuit 230 may have multiple correlators to try to detect each possible signal.

Figure 3B:
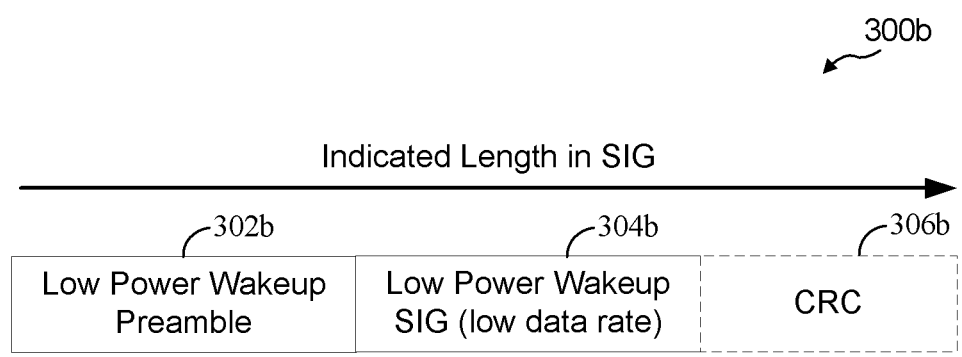
FIG. 3B shows another example of a low power wake up signal, in accordance with an implementation of the invention.

FIG. 3B shows another possible structure for a low power wake-up signal 300b. The low power wake-up signal includes two portions. This first portion 302b includes a 'global' sequence (robust), i.e. like a 'low power wake up preamble.' This may allow the low power receiver 228 to detect that a low power signal 300b is coming up. The second portion 304b, following the first portion 302a, includes encoded information. The encoded information may indicate the identifier of the STA 106e to be woken up or other information. Optionally, there may be a third portion 306b including a checksum for error detection. The first portion 302b may be formed using an on-off keying, frequency-shift keying, or other modulated preamble sequence that may provide the timing and detection. In some implementations, the second portion 304b may include data that may be spread/encoded. Spreading/encoding may be agreed by transmitting and receiving STAs.

In addition, the low power wake-up signal may be provided in a sequence of transmissions that provide for coexistence. For example, an additional 'Wake up PPDU format' preamble may be provided, such as an new wake-up PPDU format for a 802.11 OFDM PHY preamble followed by the new low power wake-up signal. The OFDM PHY preamble may indicate a duration (in SIG field) that makes 802.11 STAs defer for the duration of the signal and the wake-up time for the receiver. The 802.11 STAs may assume there is a regular packet coming up. As such, reception of the payload may fail, but the 802.11 STA defers for the time indicated in PHY preamble. Furthermore, the low power wake-up signal may be provided to have up to ~20 ms signaling duration to match the duration of a typical PPDU. In addition, Null Packets (QoS Null frames to the STA) may be sent during the wake-up time (e.g., period of time the transceiver 214 of the low power receiver STA 106e needs to be turned on) to make sure other devices honor contention based mechanisms for accessing the channel. In addition, there may be multiple wake-up signals protected by a same PHY preamble. In addition, the PHY preamble may have a bandwidth that narrower than an 802.11 preamble.

Figure 4:
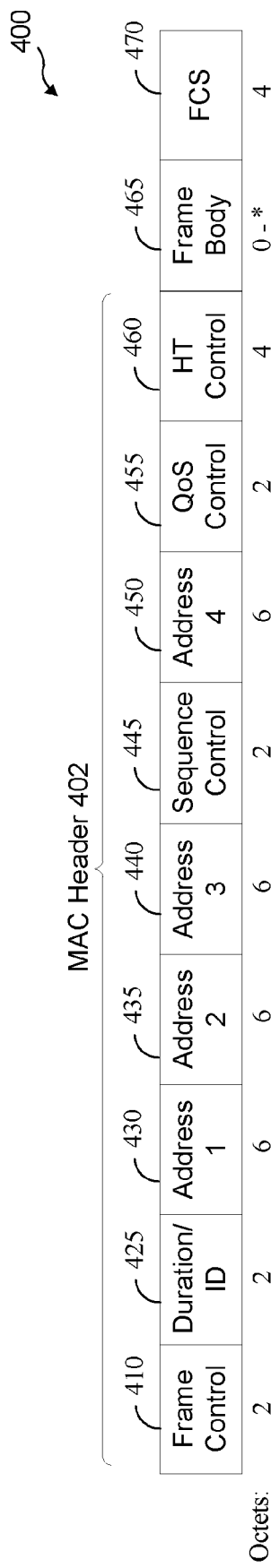
FIG. 4 shows an example of a structure of a media access control (MAC) frame 400.

FIG. 4 shows an exemplary structure of a media access control (MAC) frame 400. As shown, the MAC frame 400 includes 11 different fields: a frame control (fc) field 410, a duration/identification (dur) field 425, a receiver address (a1) field 430, a transmitter address (a2) field 435, a destination address (a3) field 440, a sequence control (sc) field 445, a fourth address (a4) field 450, a quality of service (QoS) control (qc) field 455, a High Throughput (HT) control field 460, the frame body 465, and a frame check sequence (FCS) field 470. The fields 410-460 make up the MAC header 402. Each field may be comprised of one or more sub-fields or fields. For example, frame control field 410 of media access control header 402 may be comprised of multiple subfields, such as a protocol version, type field, subtype field, and other fields discussed below with respect to FIG. 6.

Figure 5:
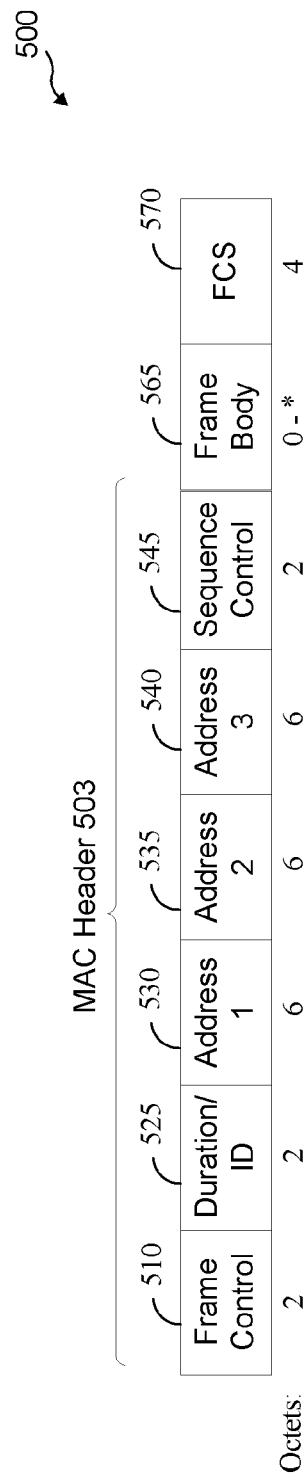
FIG. 5 illustrates an example of a structure of a media access control (MAC) frame 500.

FIG. 5 shows another implementation of a MAC header 903. MAC header 503 differs from MAC header 802 in that it does not include the QOS Control field 455 and HT Control field 460.

Figure 6:
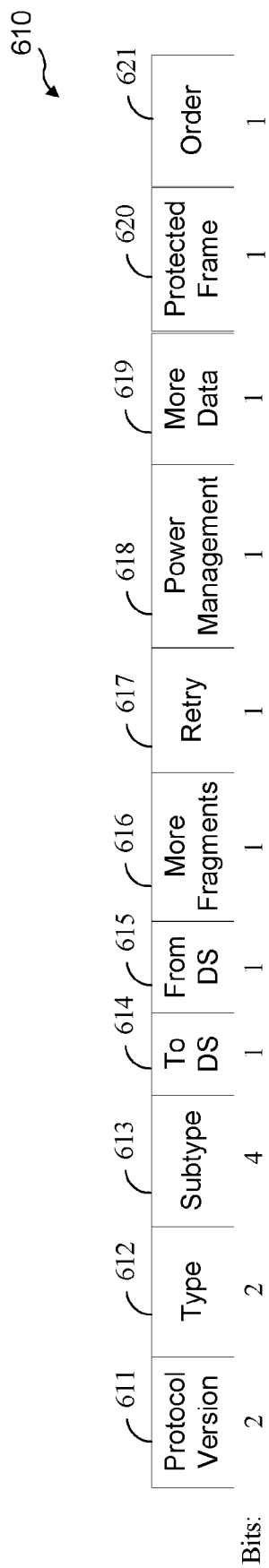
FIG. 6 illustrates an example of a structure of a media access control (MAC) of the MAC headers shown in FIGS. 4 and 5.

FIG. 6 shows an exemplary structure of a frame control field 410 and 510 of the MAC headers 402 and 503 shown in FIGS. 4 and 5 respectively. As shown, the frame control field includes a protocol version field 611, a type field 612, a subtype field 613, a To DS field 614, a from DS field 615, a more fragments field 616, a retry field 617, a power management field 618, a more data field 619, a protected frame field 620, and an order field 621. The type of the MAC frame 500 may be defined by the combination of type and subtype fields 612 and 613. For example, for a management frame, the type field 612 may have a binary value of 00. The subtype field 613 may then indicate the type of management field with a four bit value providing 16 different management field types. As another example, the type of MAC frame 500 may be a control frame indicated by a type field 612 with a binary value of 01. The subtype field 613 may further indicate different types of control fields such as block ack request frames, block ack frames, PS-poll frames, request to send (RTS) fields, clear to send (CTS) fields, and the like.

In some cases it may be advantageous to define new types and formats of MAC frames for different uses/purposes. For example, it may be advantageous to define a new management frame type to provide for enhanced power management capabilities. For example a new management frame subtype may indicate a management frame defining how a power management indication of a wireless message should be interpreted by a receiver. In an implementation, the new management frame may define whether the indication of a second power management state indicates the second or a third power management state. For example, in an implementation, the new management frame may include data defining how the indication should be interpreted. In an implementation, the data may be included in an extended capabilities element. Alternatively, two new management frames may be defined.

In this implementation, a first new management frame defines the power management indication to indicate a second power management state, while a second new management frame defines the power management indication to indicate a third power management state.

Figure 7:
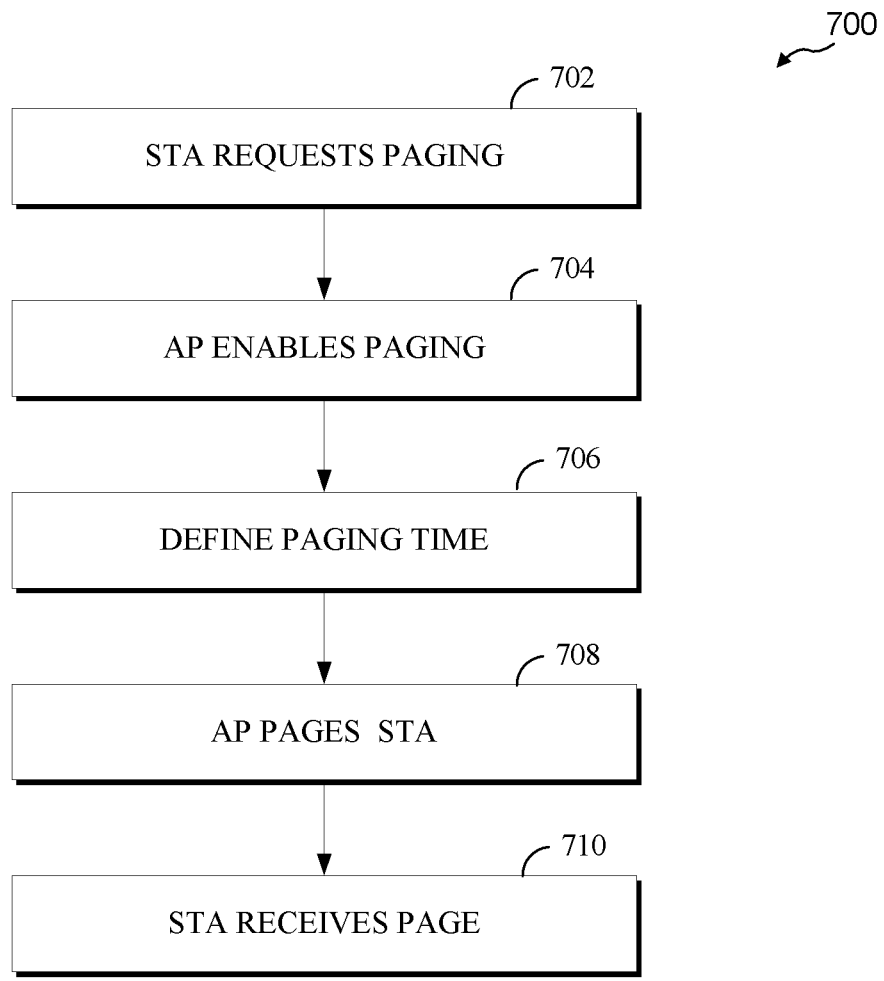
FIG. 7 illustrates an example of a process to establish paging.

FIG. 7 illustrates an example of a process 700 to establish paging in a communication system. In some implementations, the STA is operated in a Power Save (PS) mode with two operational states for the primary receiver: doze or awake. At block 702, the STA sends a request that the AP enable a (very short) paging mode 704 that utilizes communications to a second receiver (a low-power receiver) at the STA. At block 704, the AP enables paging. The STA may indicate a preferred operational setting. Possible paging mechanisms may be a management frame, a PHY preamble, or similar implementation.

At block 706 one or more times for sending and/or receiving page transmissions are defined. The times when the STA is expected to receive the page may be similar to, or offset from, periodic Target Beacon Transit Times (TBTT). The times may differ per STA. In some implementations, multiple STAs may be assigned the same target time. Similar to beacon transmissions, there can be a Delivery Traffic Indication Message (DTIM) such as considering the time until beacon transmission (DTIM-TUBT), or every N TUBTs. In some implementations, this is where the AP may send ultra-low power (ULP) messages indicating broadcast or multicast BUs are available, or that the AP wants all the active STAs to start contention.

At block 708, at the defined target times or time ranges, the AP may send page(s) to the STA. The STA receives pages using its low power receiver as illustrated in block 710. The AP may assume the STA is awake at the target wake up time to send pages. At some times, the STA may not have the full WiFi receiver on; instead, the STA may only have a low power receiver designed to receive paging messages.

In some implementations, the low power receiver stays on. In other implementations, the STA would turn on the low power receiver before the time of receiving an expected page to allow for wake-up time, warm-up and clock (or timing) drift. The AP needs to be aware of whether the STA is in active state or doze state. When the STA is in active state, the AP may or may not be aware of whether both of the STA's receivers are activated ("fully awake"), or if only the low power receiver is awake. In some implementations, the AP uses knowledge of the STA state and specific receiver activation status (when known) to optimize the signals and signal transmissions.

For cases where the AP has BUs for a STA, in some implementations the AP would transmit a page to the STA at the target wake up time by unicast, groupcast, or multicast, depending on the implementation. Such messages may be directed to one, some, or all STAs active at that time. Accordingly, STA identifiers may be included in pages. In some implementations, the paging signal may be a segment of the TIM. For this case, the AP may use a groupcast. The AP can request that STAs on this segment of the TIM are in a listen mode during the time of the groupcast, or otherwise communicate with the STAs to ensure they are in a listen mode to receive the groupcast. Accordingly, each segment may be transmitted outside of the beacon in a pre-determined time for the STAs on that segment.

In some implementations, pages are defined and known to the AP and STAs.

There may be a limited number of page types and parameters for those types. In some implementations, the AP doesn't send another type of message at the target time. For some implementations the STA can use a low power receiver designed to receive the potential set of messages.

In some implementations and at some times, the AP may send a page even if no data is buffered. The page may indicate that there isn't any buffered data. This page may be used for synchronization, have information about the communications medium, a change of protocol, a change of TBTT, change of an ID, or other management information.

Figure 8A:
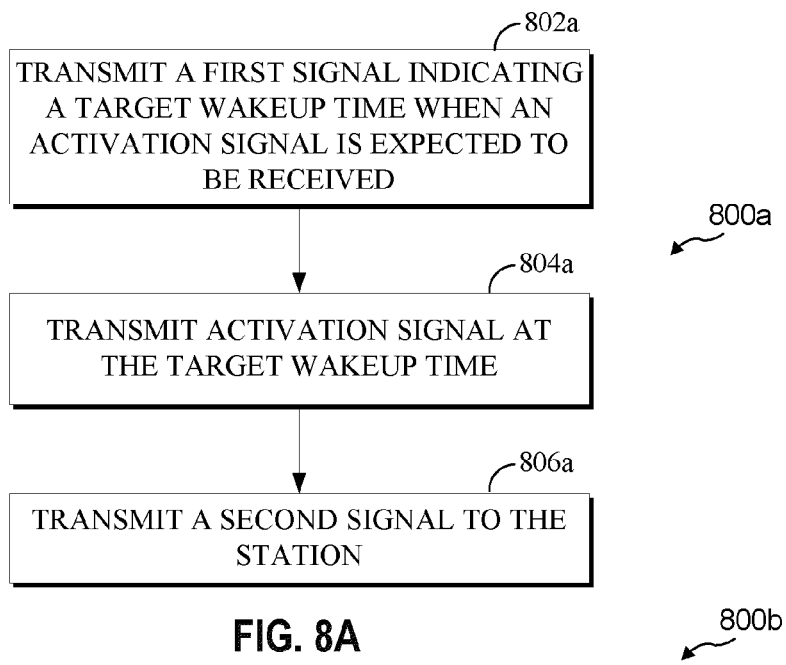
FIG. 8A illustrates an example of a process taken by an access point for an implementation using a wake up page to a low power receiver to activate a primary receiver for subsequent transmissions.
Figure 8B:
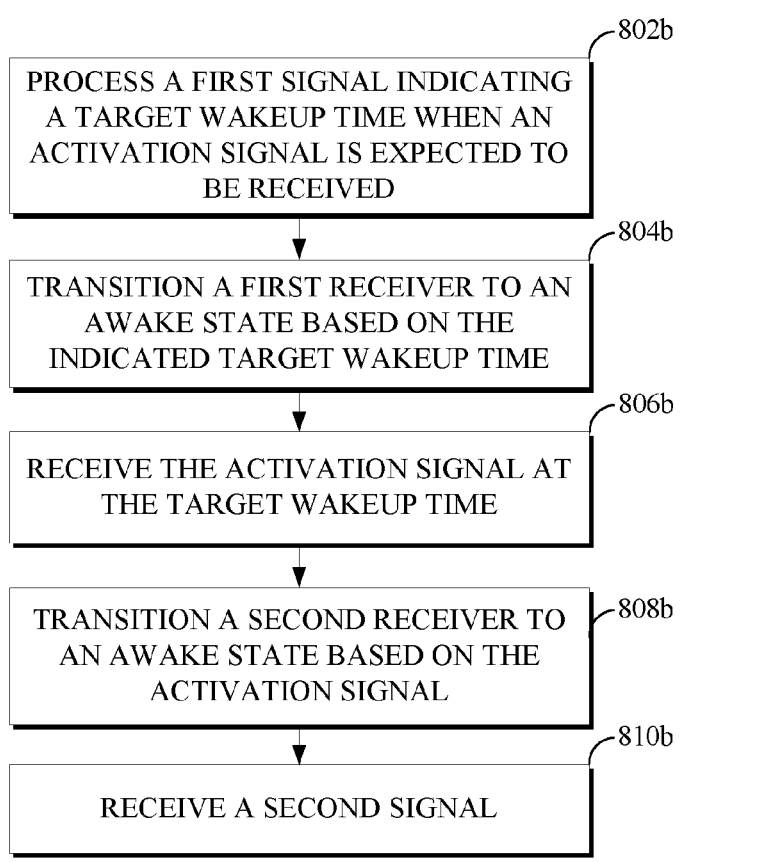
FIG. 8B illustrates an example of a process taken by a station for an implementation using a wake up page to a low power receiver to activate a primary receiver for subsequent transmissions.
Figure 9:
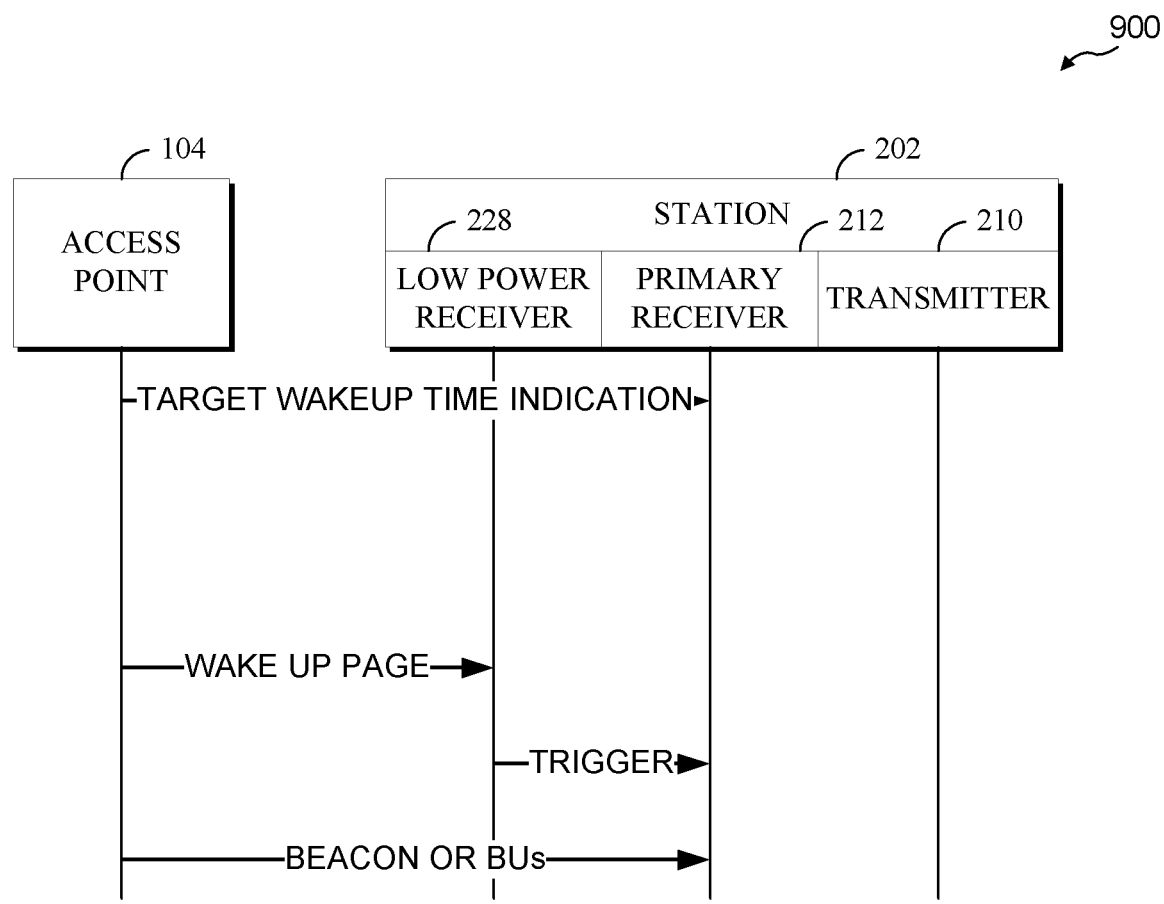
FIG. 9 shows an example of a sequence diagram for an implementation of wireless communications using a wake up page to a low power receiver to activate a primary receiver for subsequent transmissions.

FIGS. 8A, 8B, and 9 show an implementation of a process for near passive receivers to conserve power by reducing power consumption. Referring to FIG. 8A illustrates an example of a process taken by an access point transmitting a wake up page to a low power receiver to activate a primary receiver for subsequent transmissions. Process 800a of FIG. 8A shows the process of a device such as an AP 104. As previously described, STAs may be configured to reduce power consumption by a power saving scheme that places the wake-up circuit in a doze or in an awake state. Thus, the ULP receiver may be cycled off periodically, according to a periodic interval. Moreover, as previously described, the STA and AP agree on a target wake up time. Thus, at block 802a a processing circuit, or processor, of the AP may be configured to transmit a first signal indicating a target wake up time when an activation signal is expected to be received. This ensures the STA wake-up circuits will be awake when the activation signal, or page, is transmitted. The target wake up time may be based on a periodic interval. At block 804a the AP transmits an activation signal at the target wake up time. The activation signal may be a page. In some implementations, the STA does not provide the AP any acknowledgement or communication indicating the page was received. At block 806a the AP then sends a second signal to the STA, for example a beacon or another signal communicating data to the STA.

FIG. 8B illustrates an example of a process 800b performed by a wireless device (or STA) using a page to a low power receiver to wake-up a primary receiver of the STA to receive one or more subsequent transmissions. At block 802b a processing circuit of the STA processes a first signal transmitted to the STA indicating a target wake up time when an activation signal is expected to be received. At block 804b, the STA transitions a first receiver to an awake state based on the indicated target wake up time. The first receiver may be the low power receiver (for example, low power receiver 228 in FIG. 2). At block 806b the STA receives the activation signal at a first receiver, for example a page, at the target wake up time from an AP. The first receiver may be a low power receiver. As described in accordance with FIG. 8A, the activation signal, or page, transmission time may be based on a periodic interval to ensure the STA wake-up circuits are awake when the page is transmitted. At block 808b a second receiver is transitioned to an awake state based on the activation signal. The second receiver may be the primary receiver. At block 810b, the STA receives a second signal using its primary receiver (for example, receiver 212 in FIG. 2). The signal may be a beacon or another signal communicating data to the STA.

FIG. 9 shows an example of a sequence diagram for an implementation of wireless communications using a wake up page to a low power receiver to activate a primary receiver for subsequent transmissions. In particular, sequence 900 illustrates an interaction between an AP 104 and a STA 202. For some implementations, the AP 104 may transmit the target wake up time indication. The AP 104 transmits an activation or wake-up page according to the target wake up time. The STA receives this page with the low power receiver 228. The STA activates (the "trigger") the primary receiver 212 based on receiving the page. The STA then receives one or more signals using the primary receiver 212, for example, a beacon or BU's sent by the AP 104. The STA can be in a regular power savings mode, such as PS mode or U-APSD.

Figure 10A:
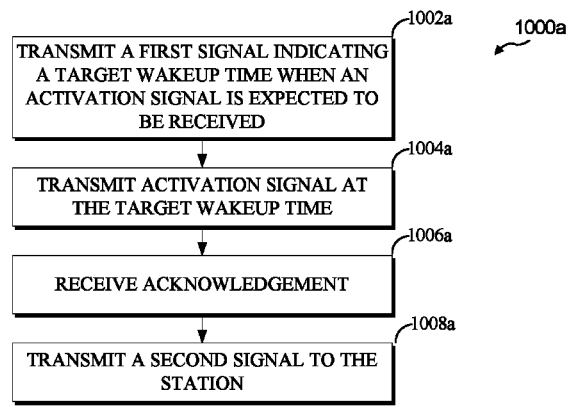
FIG. 10A illustrates an example of a process taken by an access point for an implementation using a wake up page to a low power receiver to activate a primary receiver for subsequent transmissions.
Figure 10B:
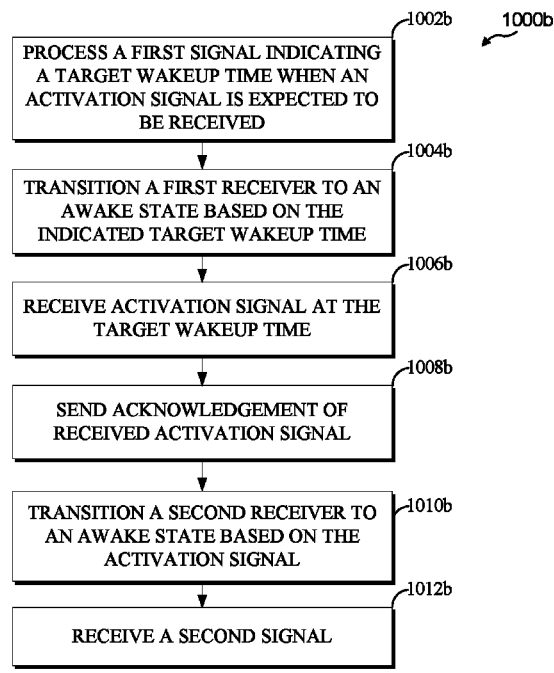
FIG. 10B illustrates an example of a process taken by a station for an implementation using a wake up page to a low power receiver to activate a primary receiver for subsequent transmissions.
Figure 11:
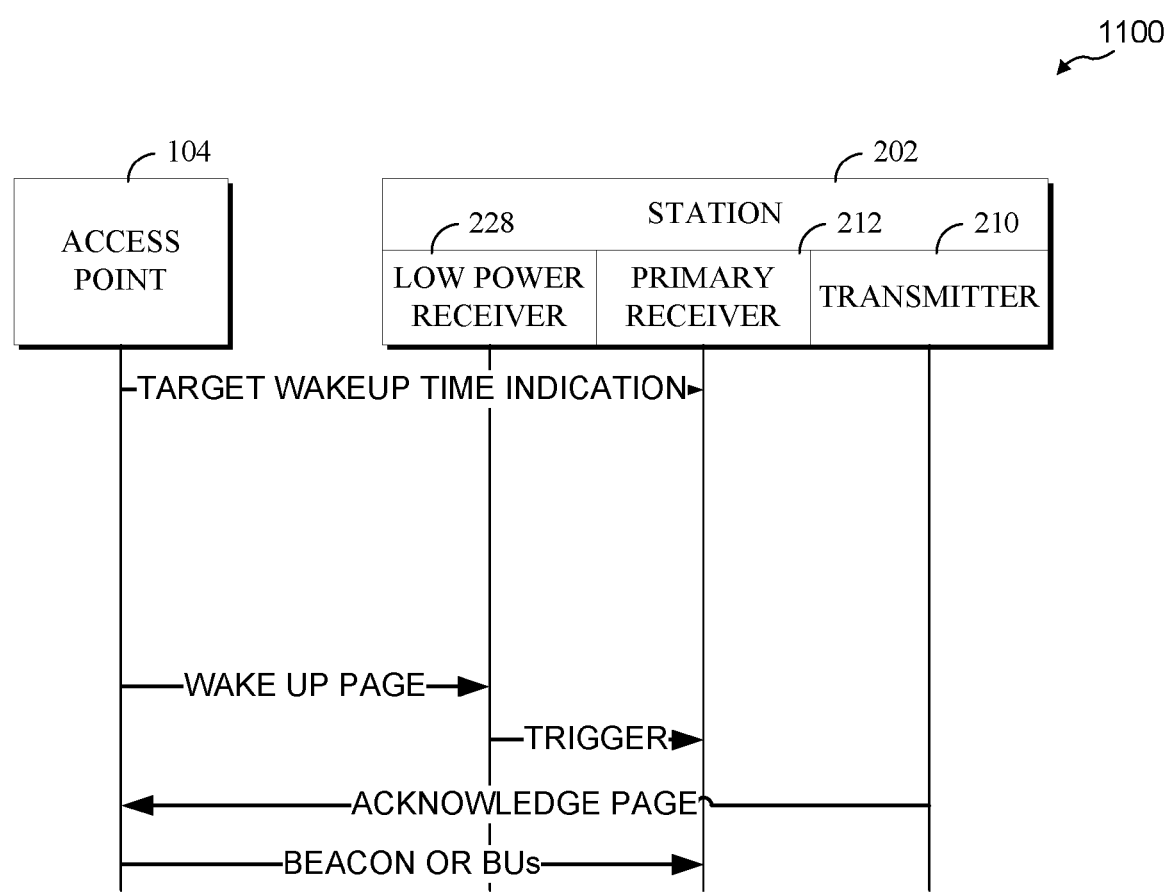
FIG. 11 shows a sequence diagram for an implementation of wireless communications using a wake up page to a low power receiver to activate a primary receiver for subsequent transmissions.

FIGS. 10A, 10B, and 11 show other process implementations of receivers to conserve power consumption. FIG. 10A illustrates a process 1000a that may be taken by a transmitting device, such as an AP. FIG. 10B illustrates a process 1000b that may be taken by a receiving device, such as a STA. FIG. 11 illustrates a sequence 1100 of interaction between the transmitting (or sending) device and a receiving device. As previously described, STAs may be configured to reduce power consumption by a power saving scheme that places the wake-up circuit in a doze or in an awake state. Thus, the ULP receiver may be cycled off periodically, according to a periodic interval. Moreover, as previously described, the STA and AP agree on a target wake up time. Referring to FIGS. 10A and 10B, at block 1002b, a processing circuit of the STA processes a first signal transmitted to the STA, the first signal indicating a target wake up time when an activation signal is expected to be received. At block 1002a, the AP transmits the first signal indicating a target wake up time when an activation signal is expected to be received. This ensures the STA wake-up circuits are awake when the activation signal, or page, is transmitted. The target wake up time may be based on a periodic interval. At block 1004b, the STA transitions a first receiver to an awake state based on the indicated target wake up time. The first receiver may be the low power receiver (for example, low power receiver 228 in FIG. 2). At block 1004a the AP transmits an activation signal at the target wake up time. The activation signal may be a page. At block 1006b the STA receives this activation signal at the target wake up time. The activation signal, or page, transmission time may be based on a periodic interval to ensure the STA wake-up circuits are awake when the page is transmitted. At block 1006b the STA receives the activation signal at the target wake up time. Based on the reception of the page, the STA awakes and at block 1008b the STA sends an acknowledgement of receiving the activation signal or page. At block 1010b, a second receiver is transitioned to an awake state based on the activation signal. The second receiver may be the primary receiver. This may be done at various times as the STA changes to a wake-up state. For example, the primary receiver can be activated before or at the same time as activating the STA transmitter, or it can be done after activating the transmitter and/or after sending the acknowledgement. At block 1008a process 1000a transmits a second signal to the STA, for example a beacon or another type of information. At block 1010b, the second signal, e.g., the beacon or other information, is received by the primary receiver of the STA.

FIG. 11 illustrates an example of process 1000a and 1000b in a sequence diagram. In FIG. 11, for some implementations, the AP 104 may transmit the target wake up time indication. The AP 104 sends a wake-up page which is received by a low power receiver 228 of the STA 202. Based on the receipt of the wake-up page, STA 202 transitions from a doze state to an active state, including activating a primary receiver 212 and a transmitter 210. The transmitter 210 sends an acknowledgement signal acknowledging receipt of the page to the access point 104. In this implementation, after receiving the acknowledgement the AP 104 may send to the STA 202 a beacon and/or other information (e.g., BU's). The STA can then follow its regular power savings mode, such as PS mode or U-APSD.

Figure 12A:
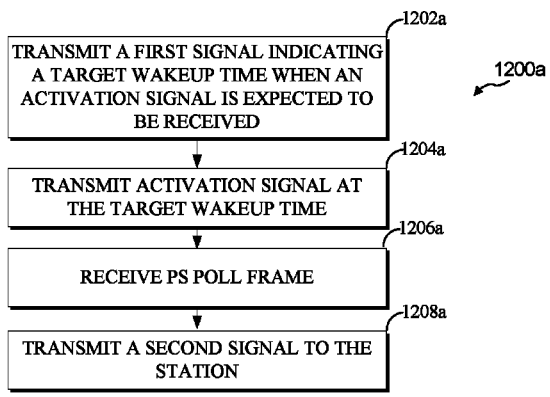
FIG. 12A illustrates an example of a process taken by an access point for an implementation using a wake up page to a low power receiver to activate a primary receiver for subsequent transmissions.
Figure 12B:
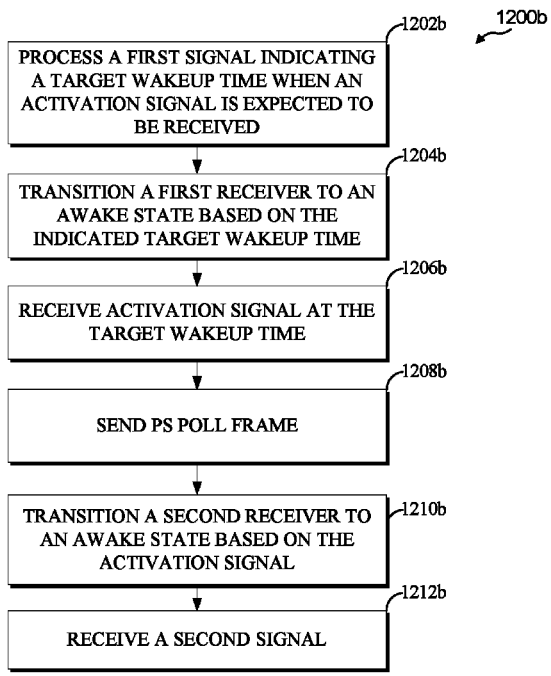
FIG. 12B illustrates an example of a process taken by a station for an implementation using a wake up page to a low power receiver to activate a primary receiver for subsequent transmissions.
Figure 13:
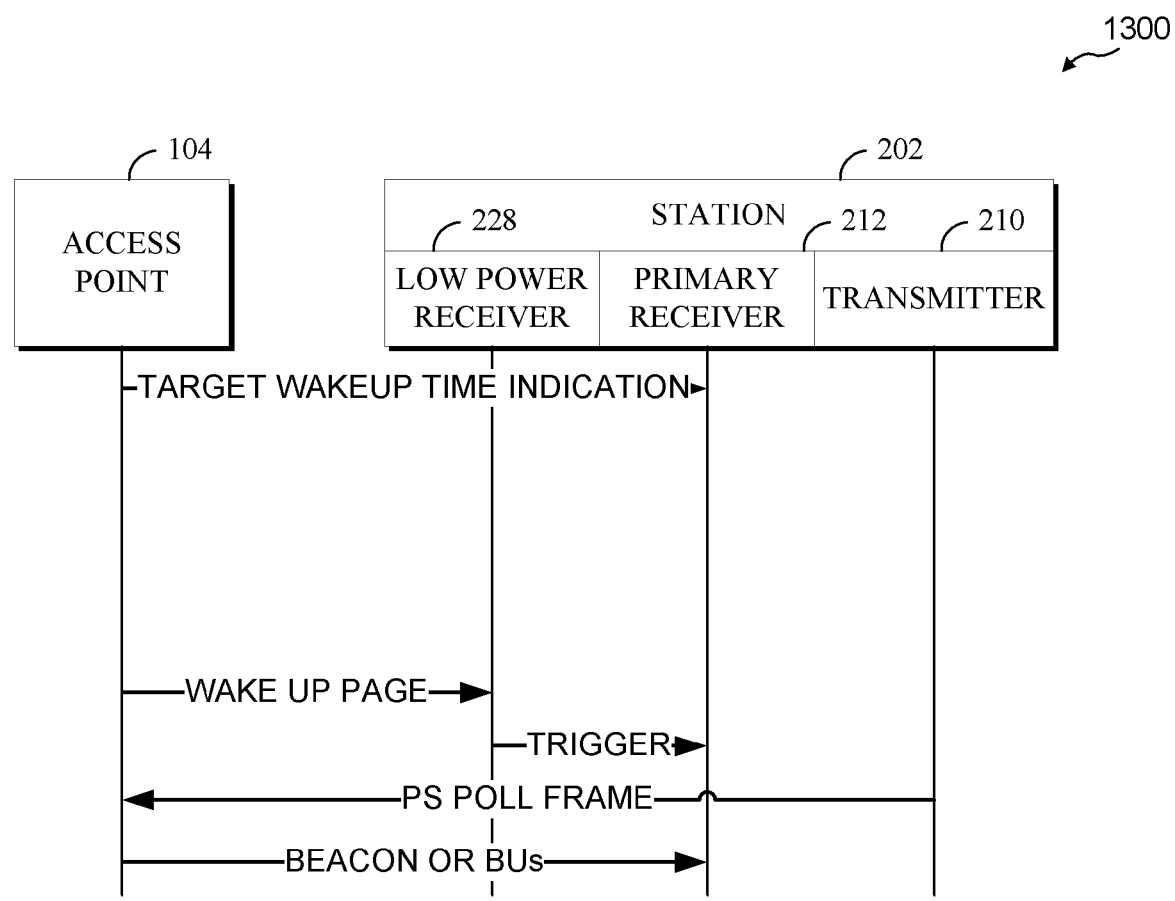
FIG. 13 shows a sequence diagram for an implementation of wireless communications using a wake up page to a low power receiver to activate a primary receiver for subsequent transmissions.

FIGS. 12A, 12B, and 13 show another possible implementation of near passive receivers to conserve power consumption. FIG. 12A illustrates a process 1200a of a device, for example an AP 104. FIG. 12B illustrates a process 1200b of by a device, for example a STA 106. FIG. 13 illustrates a sequence 1300 shows the interaction between a sending device AP 104 and a receiving device (wireless device) STA 202. As previously described, STAs may be configured to reduce power consumption by a power saving scheme that places the wake-up circuit in a doze or in an awake state. Thus, the ULP receiver may be cycled off periodically, according to a periodic interval. Moreover, as previously described, the STA and AP agree on a target wake up time. Referring to FIG. 12A, At block 1202a, the AP transmits a first signal indicating a target wake up time when an activation signal is expected to be received. This ensures the STA wake-up circuits are awake when the activation signal, or page, is transmitted. The target wake up time may be based on a periodic interval. At block 1202b, a processing circuit of the STA processes the first signal transmitted to the STA, the first signal indicating a target wake up time when an activation signal is expected to be received. At block 1204b, the STA transitions a first receiver to an awake state based on the indicated target wake up time. The first receiver may be the low power receiver (for example, low power receiver 228 in FIG. 2). At block 1204a the AP transmits an activation or wake-up page at the target wake up time. At block 1206b the STA receives this activation signal at the target wake up time. The activation signal, or page, transmission time may be based on a periodic interval to ensure the STA wake-up circuits are awake when the page is transmitted. At 1208b, the STA transitions to an active state (if in a doze state) and sends a PS-Poll frame to the AP indicating the STA is awake and can poll for downlink data. As the STA becomes active it transitions the second receiver to an awake state based on the activation signal at block 1210b. The second receiver may be the primary receiver. At block 1206a, the AP receives the PS-Poll frame. At block 1208a the AP transmits a second signal, e.g., a beacon at the next beacon time to the station. At block 1212b the second signal, e.g., the beacon or other information, is received by the primary receiver of the STA. Sequence 1300 shows this series of transaction for this implementation. The STA can then follow its regular power savings mode, such as PS mode or U-APSD.

Figure 14A:
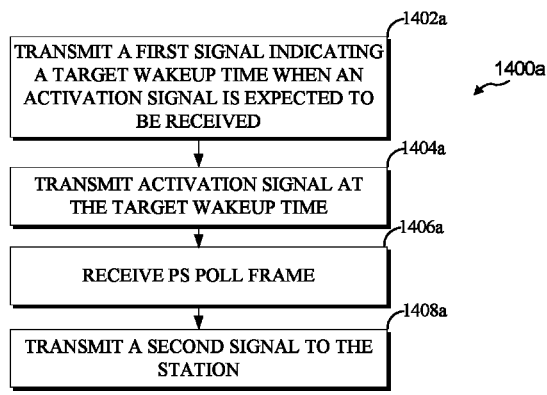
FIG. 14A illustrates an example of a process taken by an access point for an implementation using a wake up page to a low power receiver to activate a primary receiver for subsequent transmissions.
Figure 14B:
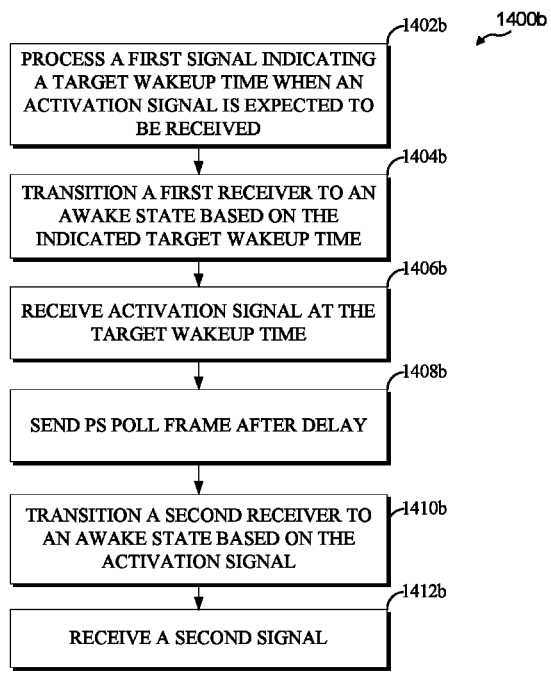
FIG. 14B illustrates an example of a process taken by a station for an implementation using a wake up page to a low power receiver to activate a primary receiver for subsequent transmissions.
Figure 15:
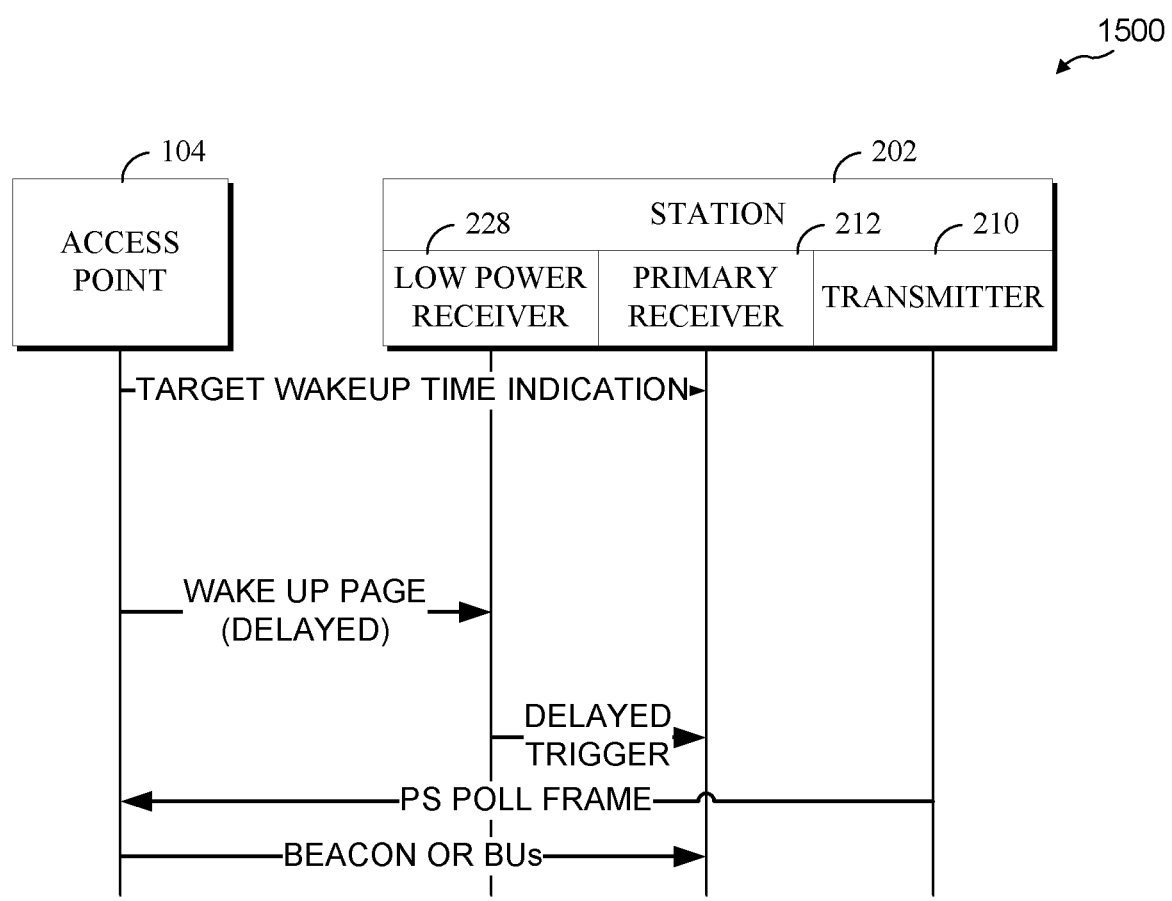
FIG. 15 shows a sequence diagram for an implementation of wireless communications using a wake up page to a low power receiver to activate a primary receiver for subsequent transmissions.

FIGS. 14A, 14B, and 15 show another possible implementation of near passive receivers to conserve power consumption. FIG. 14A illustrates the process 1400a of a transmitting device, for example, an AP 104. FIG. 14B illustrates the process 1400b of a receiving device, for example a wireless device STA 106. FIG. 15 illustrates a sequence 1500 of an interaction between a sending device and a receiving device. As previously described, STAs may be configured to reduce power consumption by a power saving scheme that places the wake-up circuit in a doze or in an awake state. Thus, the ULP reciever may be cycled off periodically, according to a periodic interval. Moreover, as previously described, the STA and AP agree on a target wake up time. Blocks in both FIGS. 14A and 14B are referred to in describing process 1400a and 1400b below. At block 1402a, the AP transmits a first signal indicating a target wake up time when an activation signal is expected to be received. This ensures the STA wake-up circuits are awake when the activation signal, or page, is transmitted. For some implementations, at block 1402b, a processing circuit of the STA processes the first signal transmitted to the STA, the first signal indicating a target wake up time when an activation signal is expected to be received. The target wake up time may be based on a periodic interval. At block 1404b, the STA transitions a first receiver to an active state based on the indicated target wake up time. The first receiver may be the low power receiver (for example, low power receiver 228 in FIG. 2). At block 1404a the AP transmits an activation or wake-up page at the target wake up time. The activation signal, or page, transmission time may be based on a periodic interval to ensure the STA wake-up circuits are awake when the page is transmitted. The STA receives this activation signal or page at the target wake up time at block 1406*b*. At block 1408*b* the STA sends a PS-Poll frame to the AP indicating to the AP the STA is awake after a delay. The STA can poll for downlink data at block 1408*b*. At block 1410*b* the STA transitions the second receiver to an awake state based on the activation signal. The AP receives the PS-Poll frame at block 1406*a*. If there is data to send, now knowing the STA is awake the AP sends the data to the STA and the STA receives the data from the AP. At block 1408*a* the AP transmits a second signal, e.g., a beacon (at the next normal periodic beacon time). At block 1412*b* the second signal, e.g., the beacon or other information, is received by the primary receiver of the STA.

Schematic sequence 1500 of FIG. 15 further illustrates an example of such interactions. In FIG. 15, the AP 104 may transmit a target wake up time indication. AP 104 sends a wake-up page which is received by a low power receiver 228 of the STA 202. The wake-up page may include information indicating the low power receiver (or low power circuitry coupled to or comprising the low power receiver) may awaken a primary receiver 212 after a certain delay (if desired, for example, as indicated in the wake up page. The wireless device also wakes-up transmitter 210. Transmitter 210 transmits a Poll message, and the Access Point 104 subsequently provides data to the STA (e.g., BUs). Also, the primary receiver 212 now also receives beacons provided by the AP 104. Once awake, the STA may be operated in a power savings mode.

In some implementations, the AP assumes the STA is awake and sends a packet (data or confirmation of being awake, or a management or control frame) after the time T, where T is specific to the STA and the AP is aware of it from the association time or a management frame.

In some implementations, the paging message may include commands that the STA needs to perform either before or after waking the primary receiver. Pages may include parameters such as timestamps, partial timestamps, AID changes, page slot changes, medium status, or other parameters defined for the wireless system that includes devices such as APs and STAs.

Figure 16:
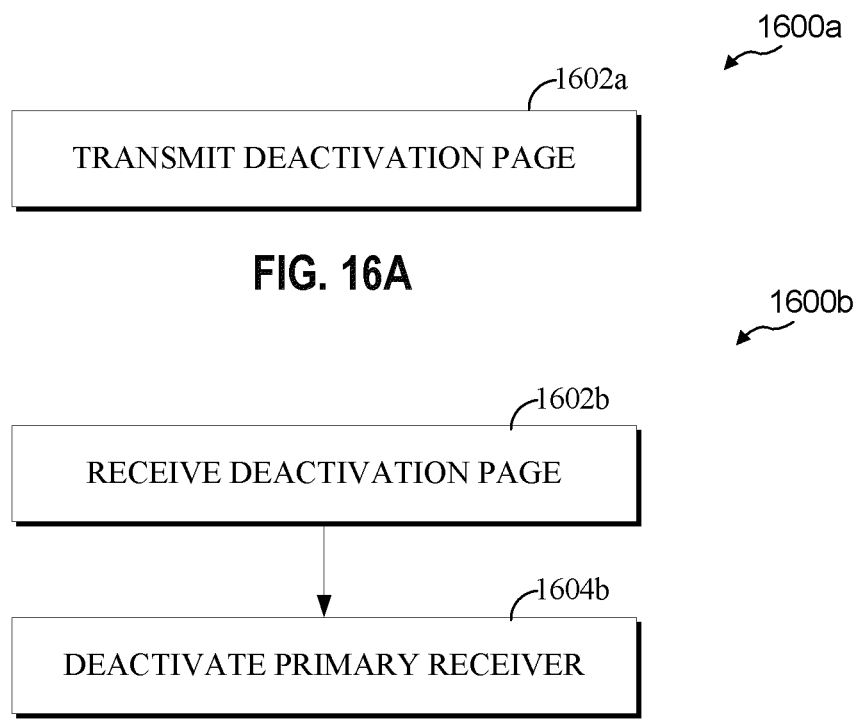
FIG. 16A illustrates an example of a process taken by an access point for an implementation using a doze page to a low power receiver to deactivate a primary receiver.
FIG. 16B shows a series of steps taken by a station for an example implementation using a doze page to a low power receiver to deactivate a primary receiver.
Figure 17:
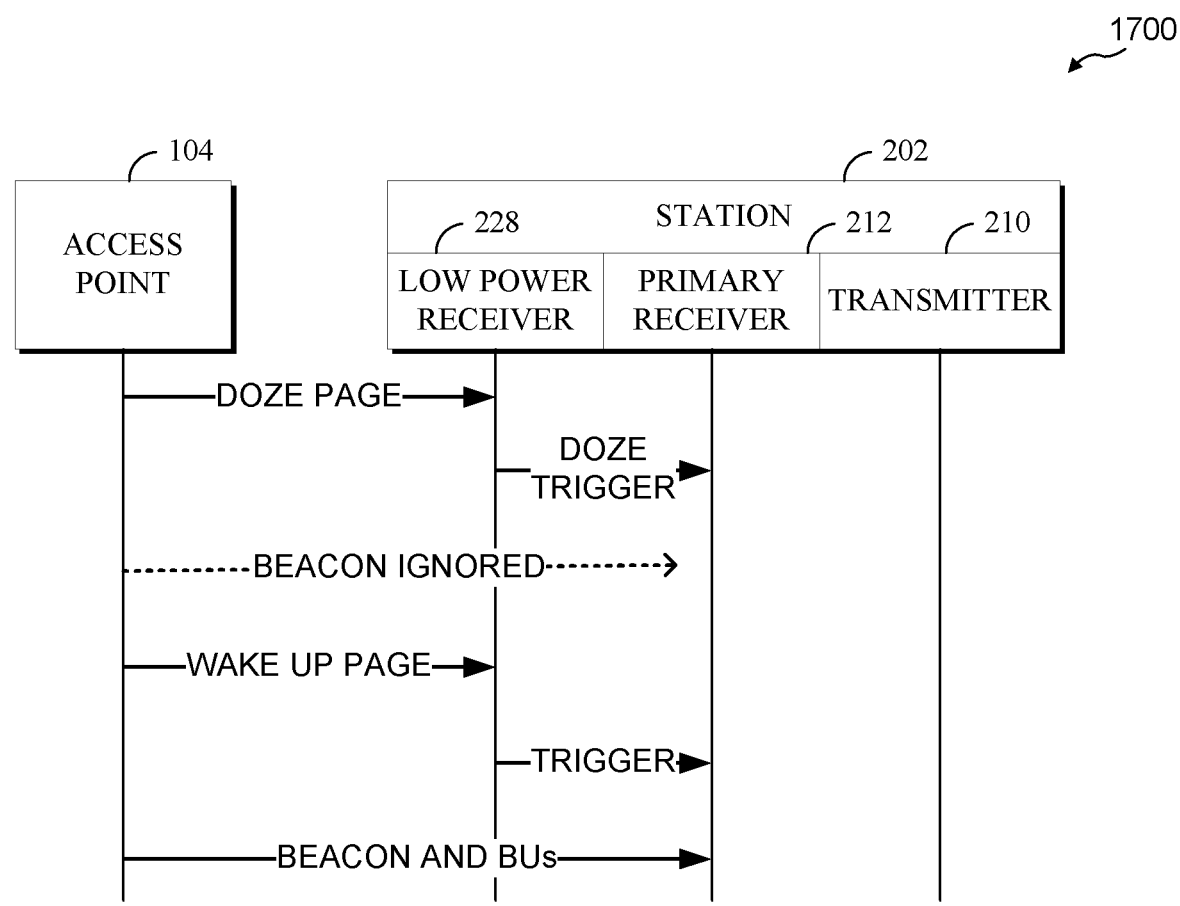
FIG. 17 shows a sequence diagram for an example implementation using a doze page to a low power receiver to deactivate a primary receiver.

FIGS. 16A, 6B, and 17 show a possible implementation of near passive receivers to conserve power consumption. FIG. 16A illustrates a process 1600*a* of a transmitting device, for example AP 104. FIG. 16B illustrates a process 1600*b* of a device, for example STA 106. FIG. 17 illustrates a sequence 1700 of the interaction between a transmitting device and a receiving device. In this example, the AP transmits deactivation or doze page at block 1602*a*. The STA receives this page at block 1602*b*, and deactivates the primary receiver at block 1604*b*. The primary receiver, when in a doze state, doesn't receive beacons or other transmissions unless it's reactivated. Sequence 1700 shows these interactions, with an example where a subsequent wake-up page triggers reactivation of the primary receiver.

Figure 18:
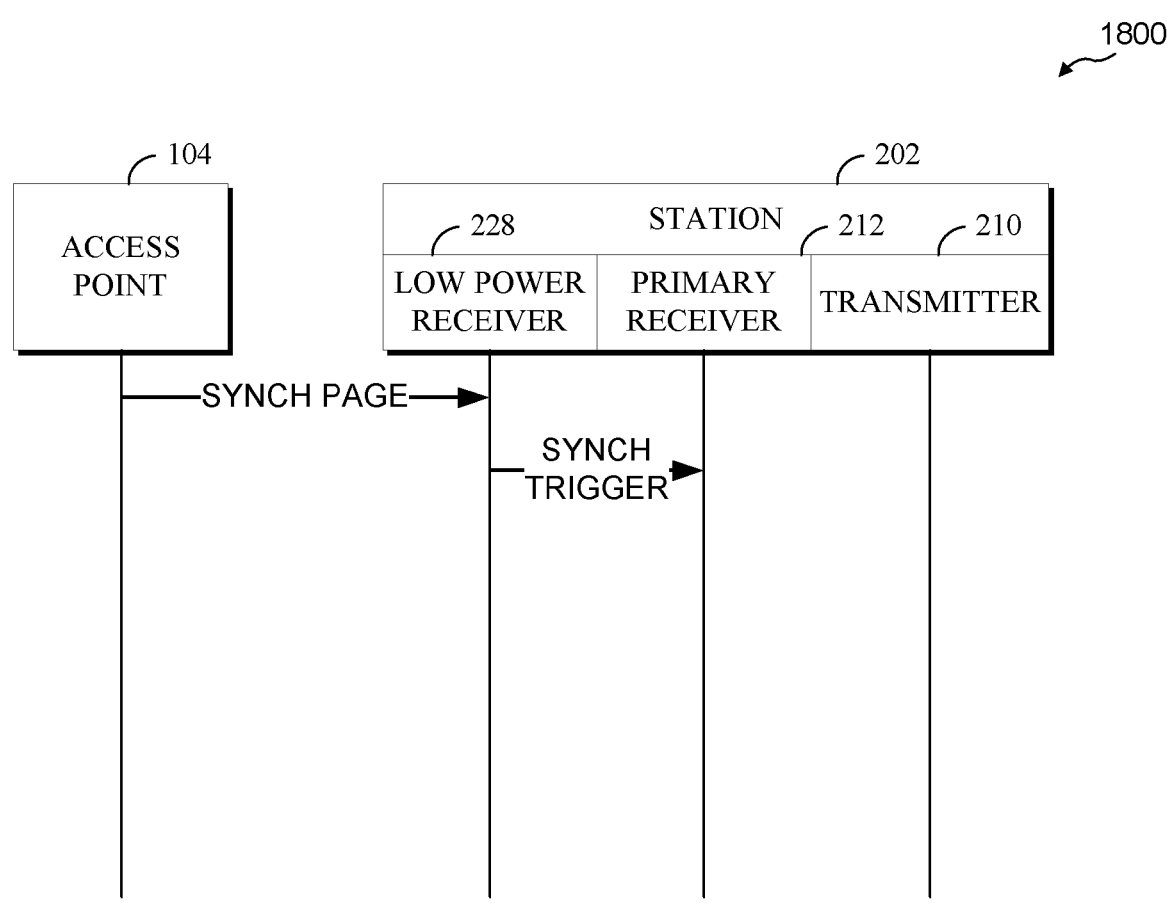
FIG. 18 shows a sequence diagram for an example implementation using a synch page to a low power receiver for synchronization between the access point and station.

FIG. 18 shows the series of transactions for an implementation where the page is a neither a wake-up page nor a doze page. In this case, the AP 104 sends a synch page that is received by the low power receiver 228 of wireless device STA 202. This synchronization can be used to synch timing with the primary receiver 212 or other components (not shown) of the STA.

Figure 19:
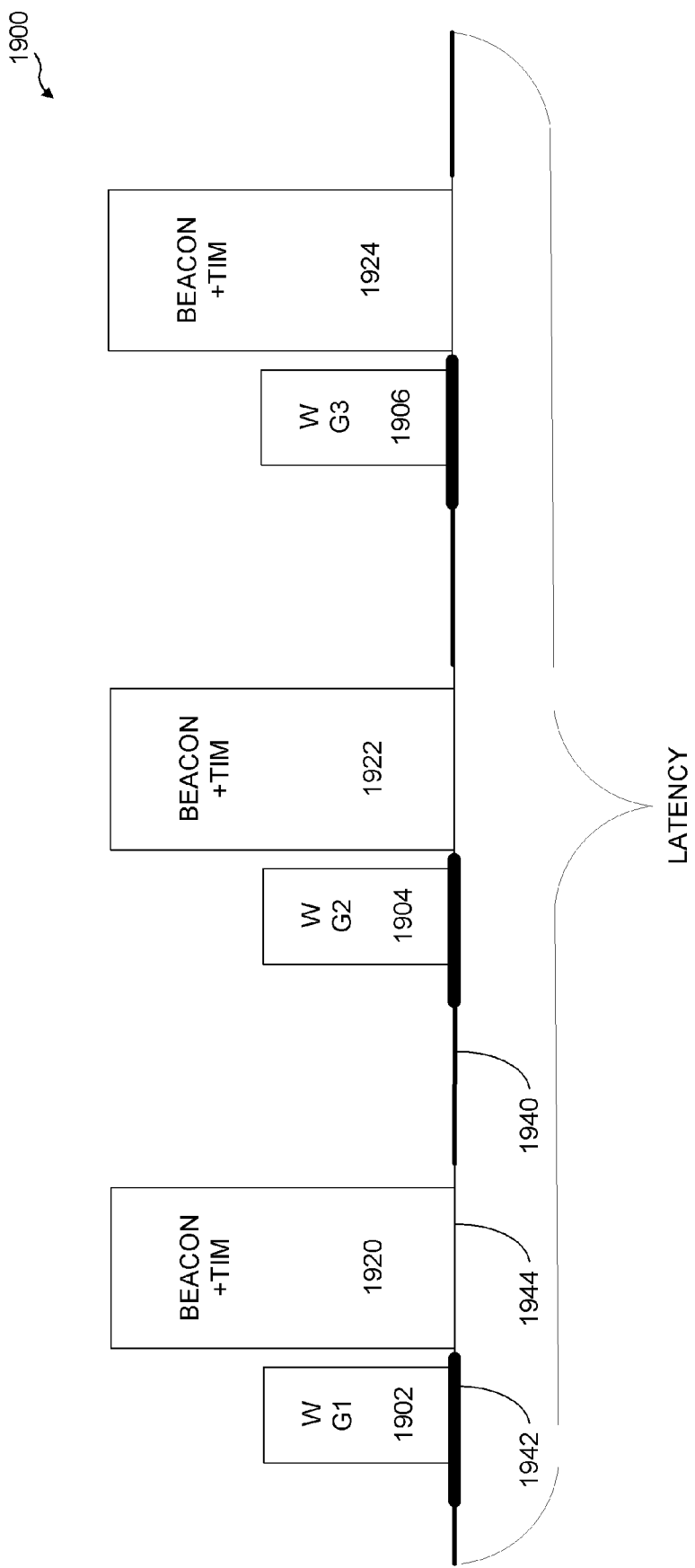
FIG. 19 shows an example power saving implementation in which the AP groups sensors, and sends wake-up pages for each subset at distinct times followed by a Beacon and TIM for each group.

FIG. 19 shows an example power saving implementation in which the AP groups sensors, and sends wake-up pages for each subset at distinct times followed by a Beacon and TIM for each group. For this implementation, the AP may send a wake-up page to each group in turn. Schematic 1900 depicts an example with three groups, G1, G2, and G3, with wake-up pages 1902, 1904, and 1906 sent at distinct times within each latency period. Different power management states are shown in 1900 on the timeline, with 1944 when the primary receiver is in awake state, 1942 when the primary receiver is in doze state but the low power receiver is in page awake state, and 1940 when both receivers are in doze state. The wake-up message may follow the Traffic Identification Map (TIM) defined per group. Transmissions may be sent using unicast, groupcast, multicast, or broadcast mechanisms. For this example, potentially fewer bits are required to wake up a unique address. Other implementations have the potential use the medium more efficiently as in this approach, more beacons are transmitted than might be necessary, and some intervals might not be used.

Figure 20:
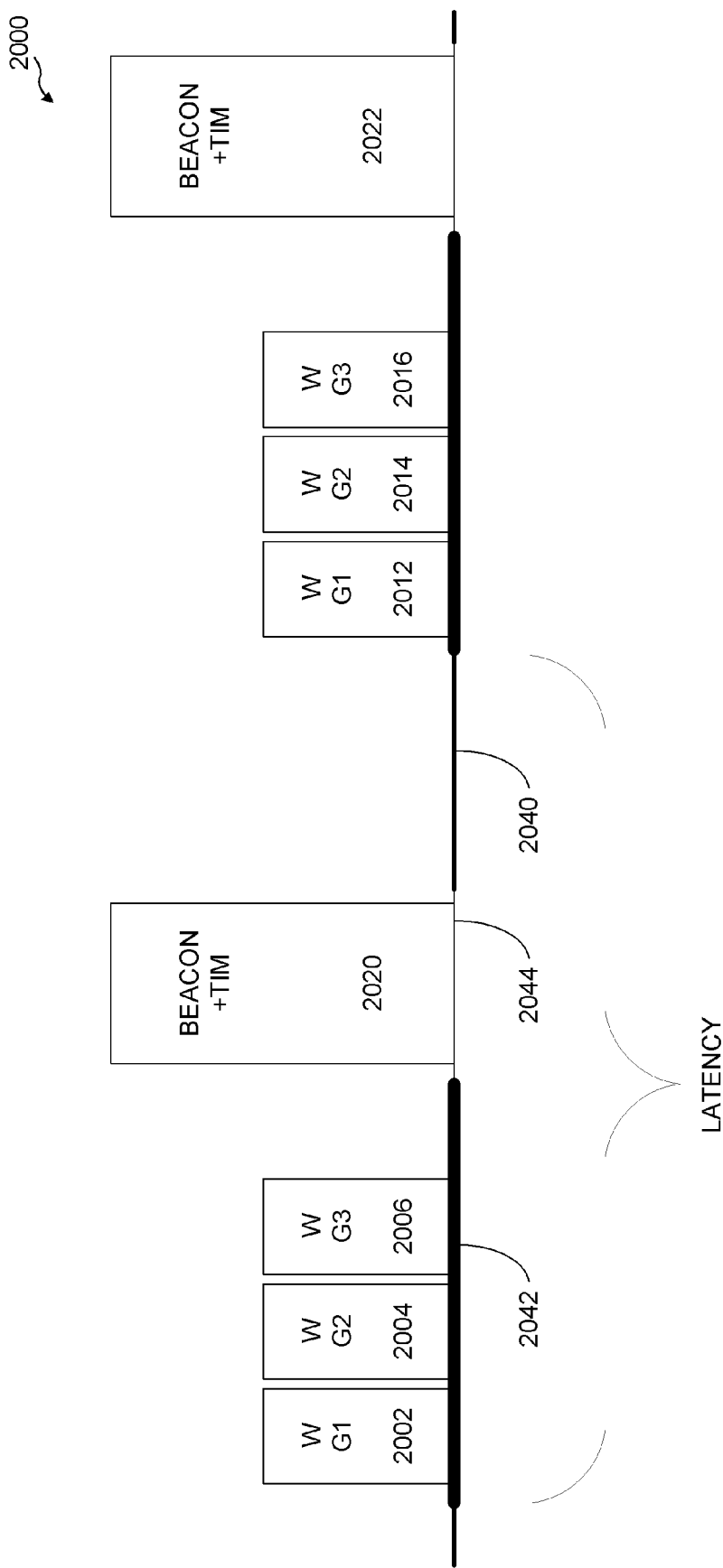
FIG. 20 shows an example power saving implementation in which the AP groups sensors, and sends wake-up pages before the traffic identification map (TIM), starting from a given time.

FIG. 20 shows an example power saving implementation in which the AP groups sensors, and sends wake-up pages before the traffic identification map (TIM), starting from a given time. Unlike the approach illustrated in FIG. 19, all STAs may follow the same TIM interval. The beacon and TIM timeframes are typically common for multiple groups. The example in 2000 shows wake-up pages 2002, 2004, and 2006 for groups 1, 2, and 3, respectively, in the first latency period preceding beacon and TIM 2020. This pattern typically repeats in subsequent latency periods. Different power management states are shown in 2000 on the timeline, with 2044 when the primary receiver is in awake state, 2042 when the primary receiver is in doze state but the low power receiver is in page awake state, and 2040 when both receivers are in doze state. For some implementations, the AP uses unicast wake-up pages. In these cases, the page timing might impinge on the beacon interval. This option has the advantage more efficient use of the medium but there may be many sequential wake up pages before the beacon if there are many groups.

Figure 21:
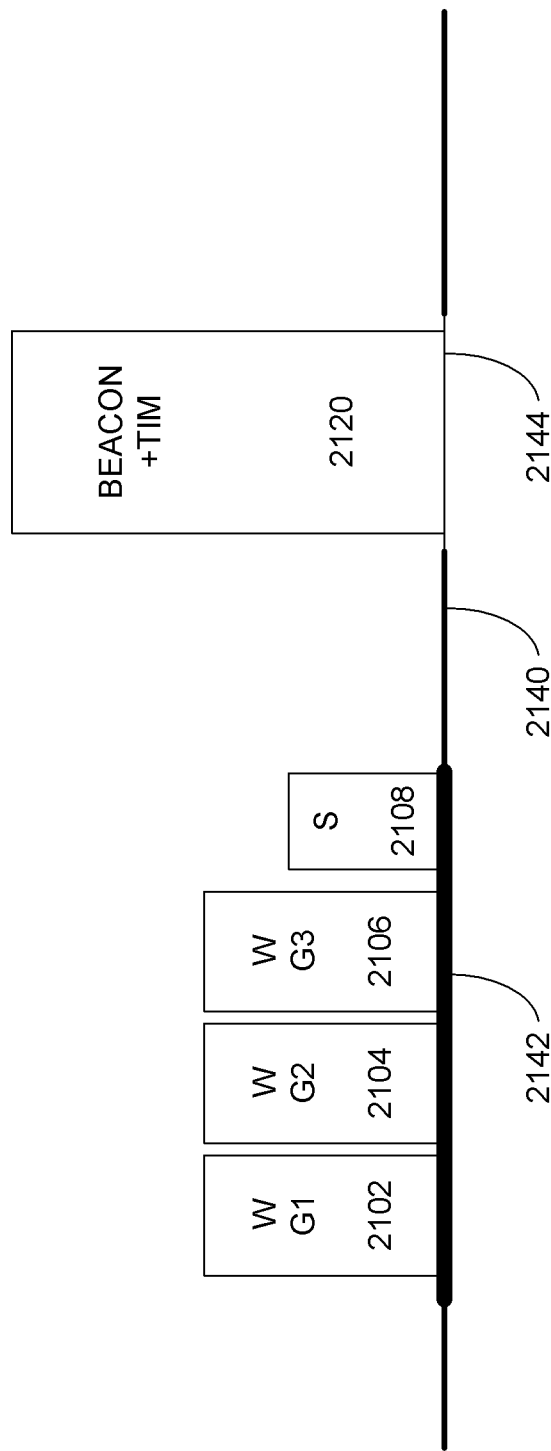
FIG. 21 shows an example power saving implementation in which the AP groups sensors, and sends wake-up pages before the traffic identification map (TIM), starting from a given time, and where a sleep page terminates the wake up receiving procedure.

FIG. 21 shows an example power saving implementation in which the AP groups sensors, and sends wake-up pages before the traffic identification map (TIM), starting from a given time, and where a sleep page terminates the wake up receiving procedure. The implementation illustrated in FIG. 21 is a variation of the implementation in FIG. 20. For some implementations, the wake pages (2102, 2104, and 2106 as an example in FIG. 21) are followed by sleep packet that terminates the wake up page receiving procedure. Once the low power receiver receives sleep page 2108, the primary receiver may transition to doze state 2140, until it's time to transition back to awake state 2144 and receive beacon 2120. In some implementations, the wake up page time is well in advance of the beacon.

Figure 22:
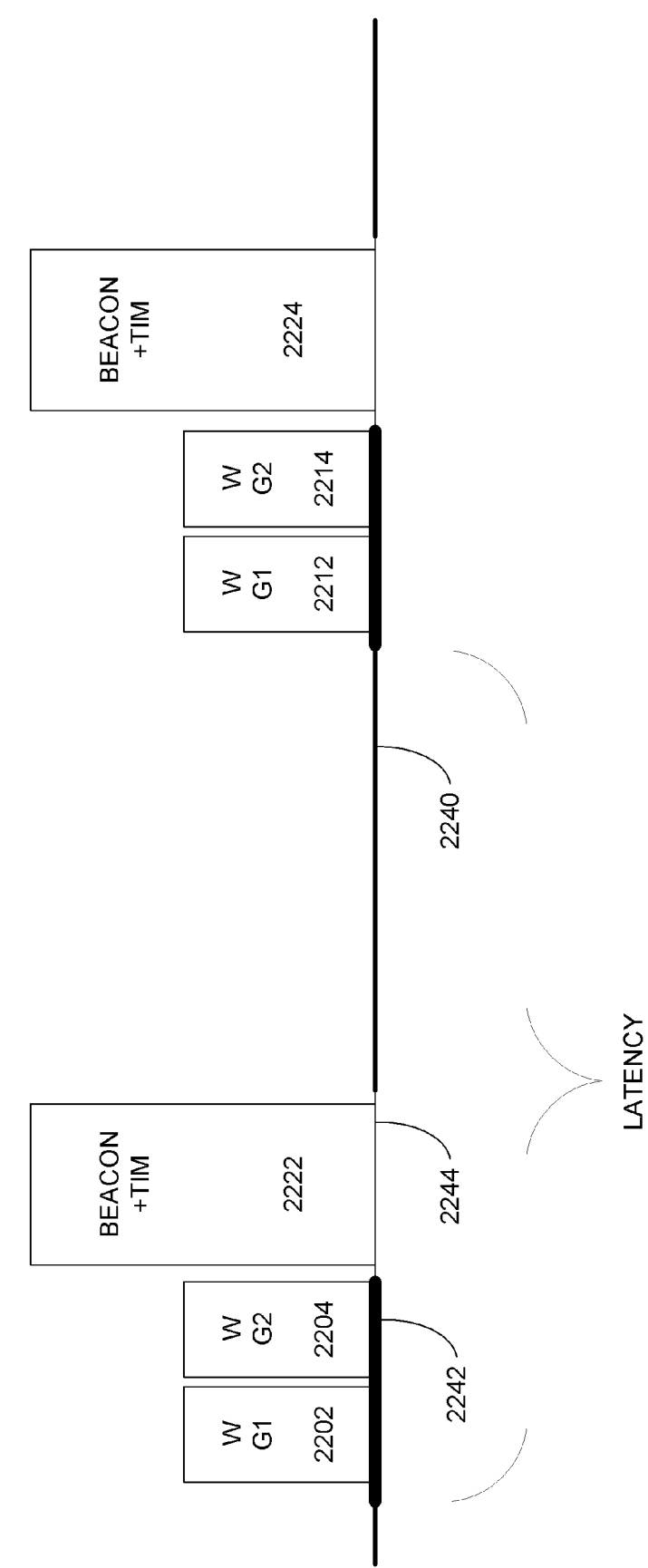
FIG. 22 shows an example power saving implementation in which the AP groups sensors, and sends a limited number of wake-up pages before each beacon.

FIG. 22 shows another possible implementation, with a limited number of wake up messages before each beacon. This is similar to the option in FIG. 20. For some implementations, there are at most K wake up pages (2202, 2204 in the first latency period, and 2212, 2214 for the next period depicted in the example). The number of wake up messages typically depends on the number of STAs paged and the number of available bits in the wake message. The AP sends K wake messages. Paging may be sent using unicast, multicast, or broadcast in different implementations. The AP may optimize the choice of transmission method.

Each beacon period starts with a TIM if needed. TIM is typically required for large groups. For small groups, a PS-poll usually suffices. Unicast transmissions don't require a TIM. FIG. 22 depicts wake up pages 2202 and 2204 in the first latency period before beacon 2222 is transmitted. Different power management states are shown in 2200 on the timeline, with 2244 when the primary receiver is in awake state, 2242 when the primary receiver is in doze state but the low power receiver is in page awake state, and 2240 when both receivers are in doze state.

Figure 23:
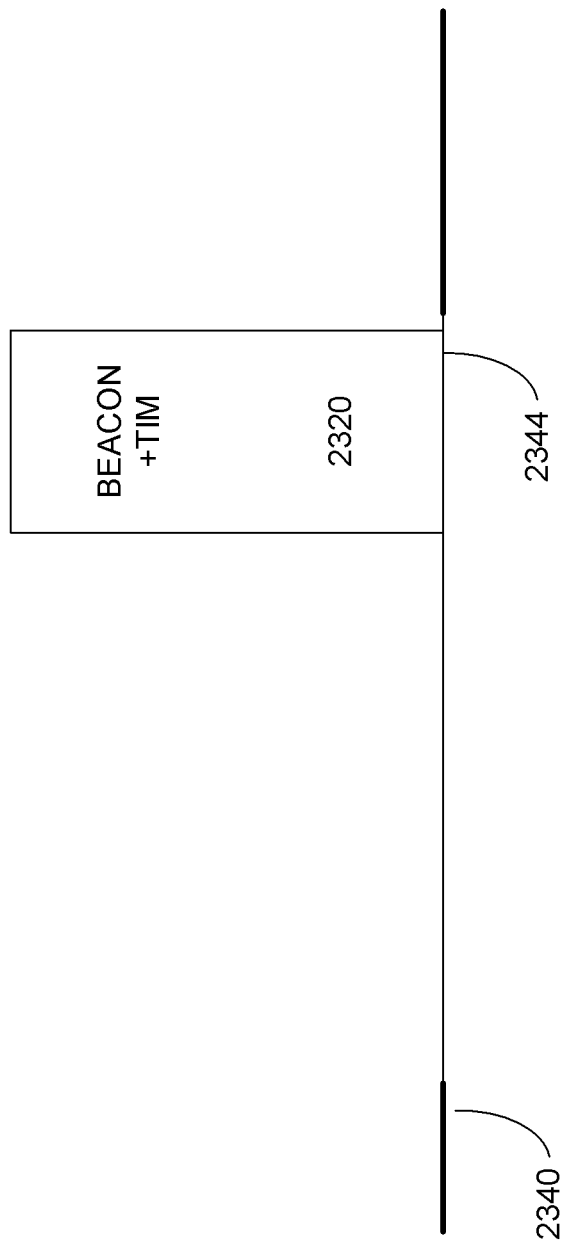
FIG. 23 shows an implementation without a low power receiver that doesn't receive sleep packets, and the primary receiver doesn't ignore beacons.
Figure 24:
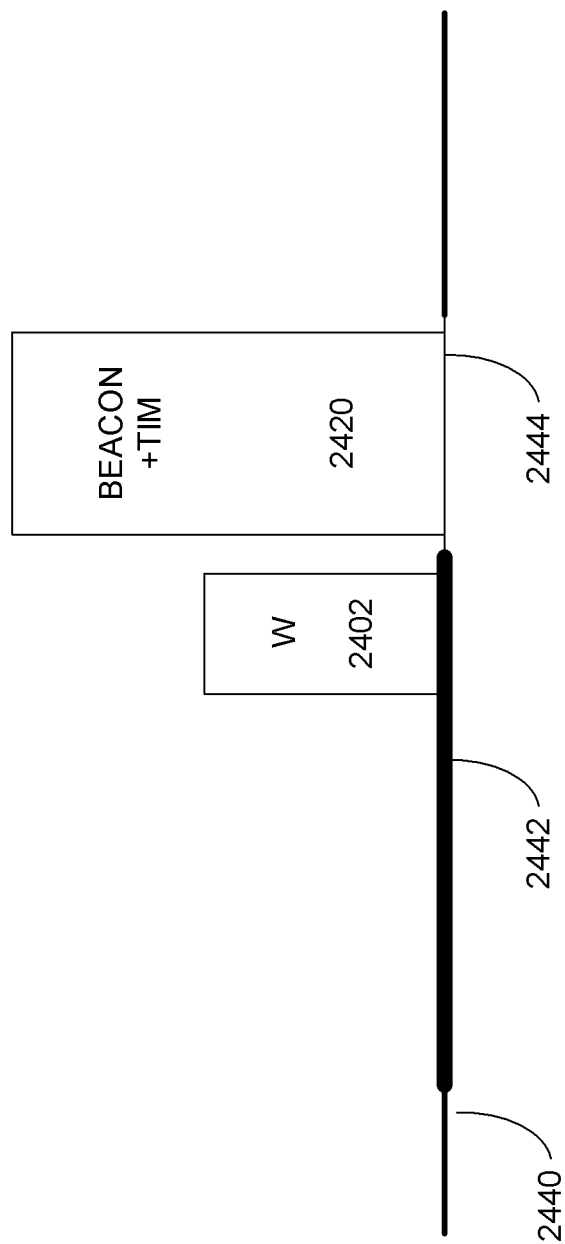
FIG. 24 shows an implementation with a low power receiver that receives a wake up page before a beacon receives that beacon.
Figure 25:
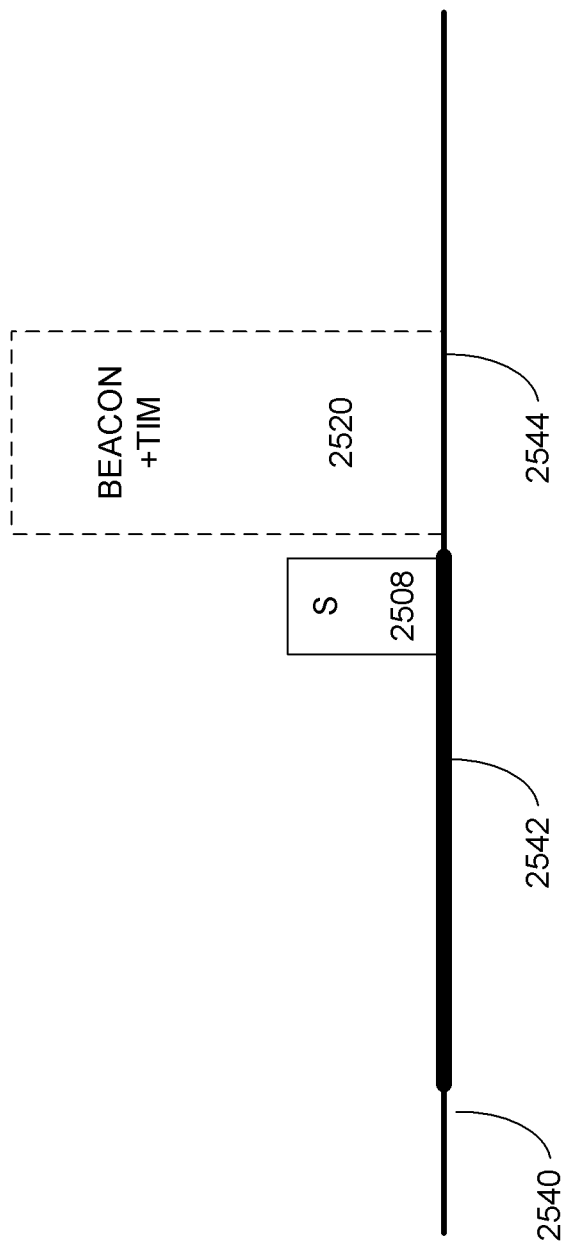
FIG. 25 shows an implementation with a low power receiver that receives a sleep page before a beacon ignores that beacon.

FIGS. 23, 24, and 25 illustrate sleep packets in use during normal Power Save mode, when STAs often listen to beacons because of low latency requirements, but no data is sent. By sending sleep packets, primary receivers may be transitioned to doze state so that beacons would not be received, to reduce power consumption. FIG. 23 shows that if there is no low power receiver, no power is saved because primary receivers receive beacons 2320 whether or not there are BUs or messages for them. The primary receiver remains in active state 2344. In FIG. 24, the low power receiver receives wake up page 2402 during page awake state 2442, and the primary receiver receives beacon 2420 as it's in awake state 2444 when the beacon is received. In FIG. 25, the low power receiver receives a sleep page 2508 while in page awake state 2542, and in response to the sleep page, the STA transitions the low power receiver to doze state 2544, the beacon is not received, and power is conserved.

Figure 26:
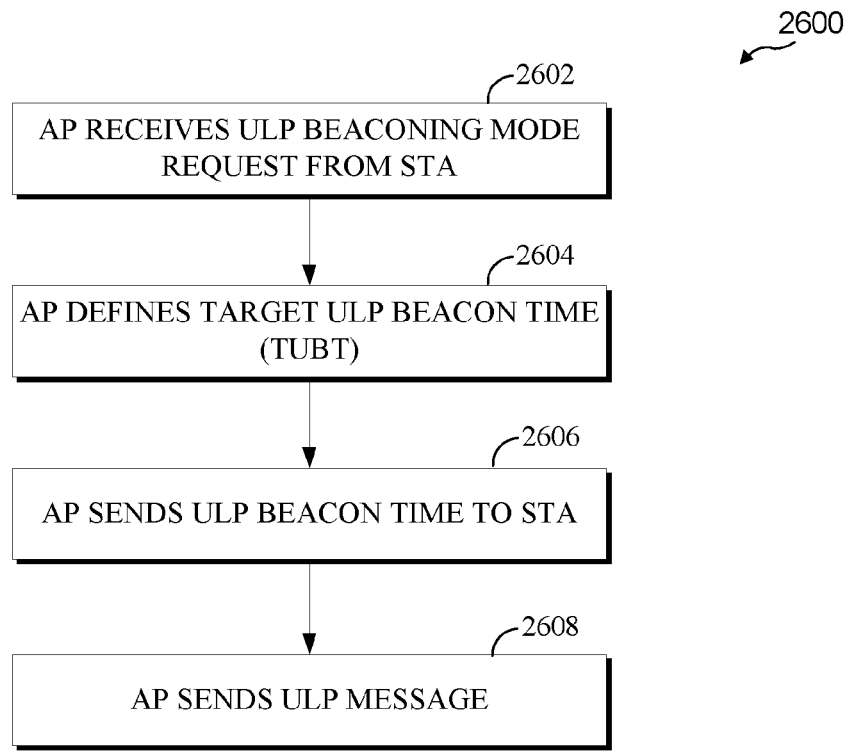
FIG. 26 is a flowchart illustrating an example of a ULP beaconing mode process taken by an access point.
Figure 27:
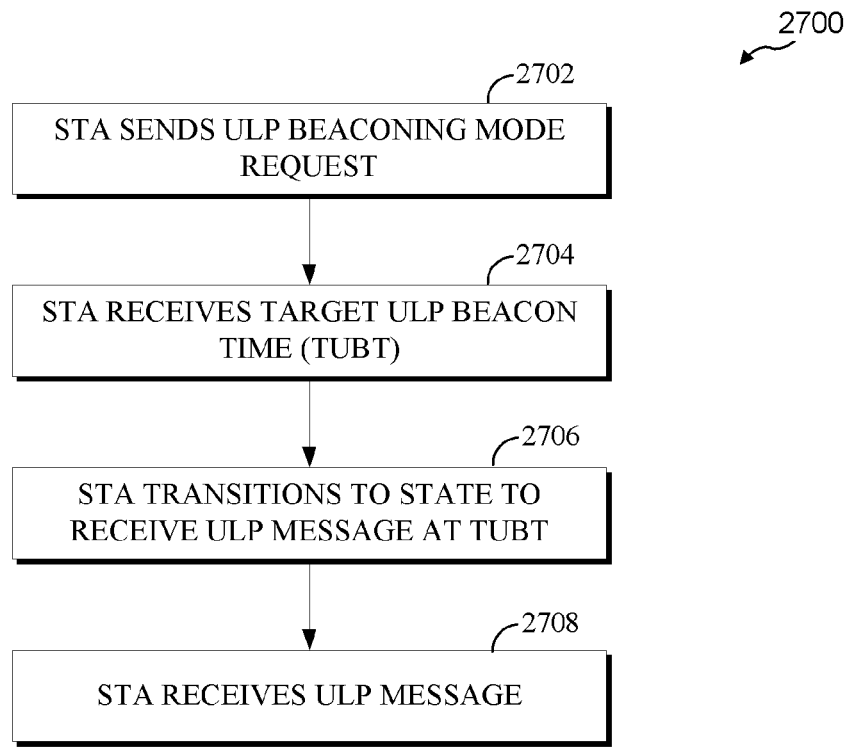
FIG. 27 is a flowchart illustrating an example of a ULP beaconing mode process taken by a station.

FIGS. 26 and 27 are flowcharts illustrating an example of a ULP beaconing mode process. FIG. 26 illustrates an example AP process 2600. At block 2602, the AP receives a request from a STA to enable ULP beaconing mode for that STA. The STA may indicate a preferred setting based on its wake-up time.

At block 2604, the AP defines at least one Target ULP Beacon Time (TUBT).

The TUBT indicates at least one TUBT when there may be a ULP wake up message send by the AP to the STA. This approach to defining and using TUBTs is similar to the approach used to define and use Target Beacon Transit Times (TBTT). The TUBT may be different for each STA. In some implementations, there may be a Delivery Traffic Indication Message (DTIM) sent every N TUBTs, wherein the AP may send ULP messages indicating that broadcast or multicast Buffer Units (BUs) are available. For some implementations, timing for the ULP message beacon (TUBT) may be defined relative to beacon timing (TBTT).

At block 2606, the AP sends the ULP beacon time to the STA. In certain implementations, the AP assumes ULP receiver is awake at the TUBT. At block 608, the AP sends the ULP message to the STA at the TUBT. In some implementations, the ULP messages are sent in a unicast. In other implementations, the ULP messages are sent to multiple STAs at the same time. The AP may send a ULP message even if no data is buffered for the STA to enable synchronization. This ULP message would indicate that there isn't any data buffered and allow for synchronization and earlier transitions to doze state.

In some implementations, the AP assumes the STA transitions from doze state to ULP state in time for TUBT. In some implementations, the AP assumes the STA transitions from ULP state to awake state in time for the TBTT when there is data for the STA. In some implementations, if no wake up signal is sent, the AP assumes the STA transitions from ULP back to doze right after TUBT and the STA stays in doze state until it's time for the next TUBT. In some implementations, when in doze state, beacons are not received. In some implementation transitions from awake state to ULP state only occur for STAs that always stay in ULP mode when not awake.

FIG. 27 illustrates an example STA process 2700. In some implementations, the STA is operated in a ULP Power Save mode, with three operational states: ULP, doze, and awake. At block 2702, the STA sends a request that the AP enable ULP beaconing mode. The STA may indicate a preferred setting, based on its wake up time.

At block 2704, the STA receives one or more times for sending and/or receiving page transmissions are defined. The times when the STA is expected to receive the page may be similar to, or offset from, periodic Target Beacon Transit Times (TBTT). The times may differ per STA. In some implementations, multiple STAs may be assigned the same target time. Similar to beacon transmissions, there can be a Delivery Traffic Indication Message (DTIM) such as considering the time until beacon transmission (DTIM-TUBT), or every N TUBTs. In some implementations, this is where the AP may send ultra-low power (ULP) messages indicating broadcast or multicast BUs are available, or that the AP wants all the active STAs to start contention.

At block 2706, the STA transitions its ULP receiver circuit's state to awake, to receive the ULP message in time for each TUBT. AT the defined target times or time ranges, the AP may send ULP message(s) to the STA. The STA receives pages using its ULP receiver as illustrated in block 408. The AP may assume the STA is awake at the target time to send pages. At some times, the STA may not have the full Wi-Fi receiver on; instead, the STA may only have a low power receiver designed to receive paging messages. In block 708, and in time for each TUBT, the STA receives a ULP message from the AP.

In some implementations, the ULP receiver stays on. In other implementations, the STA would turn on the low power receiver before the time of receiving an expected page to allow for wake-up time, warm-up and clock (or timing) drift. The AP need not be aware of the receive state of the STA (if it is in full receive, awake state or in a doze or other low power state). In other implementations, the AP may be aware of the state of the STA and use this information to optimize the signal and signal transmission.

For cases where the AP has BUs for a STA, in some implementations the AP would transmit a page to the STA at the target time by unicast, groupcast, or multicast, depending on the implementation. Such messages may be directed to one, some, or all STAs active at that time. Accordingly, STA identifiers may be included in pages.

In some implementations, ULP messages are defined and known to the AP and STAs. There may be a limited number of message types and parameters for those types. In some implementations, the AP doesn't send another type of message at the target time. For some implementations the STA can use a low power receiver designed to receive the potential set of messages.

In some implementations and at some times, the AP may send a ULP message even if no data is buffered. The page may indicate that there isn't any buffered data. This page may be used for synchronization, have information about the communications medium, a change of protocol, a change of TBTT, change of an ID, or other management information.

In some implementations, the primary transceivers of STAs enter active state by each TBTT, in time to receive the regular beacon. The STA may then follow regular PS/U-APSD modes.

Figure 28:
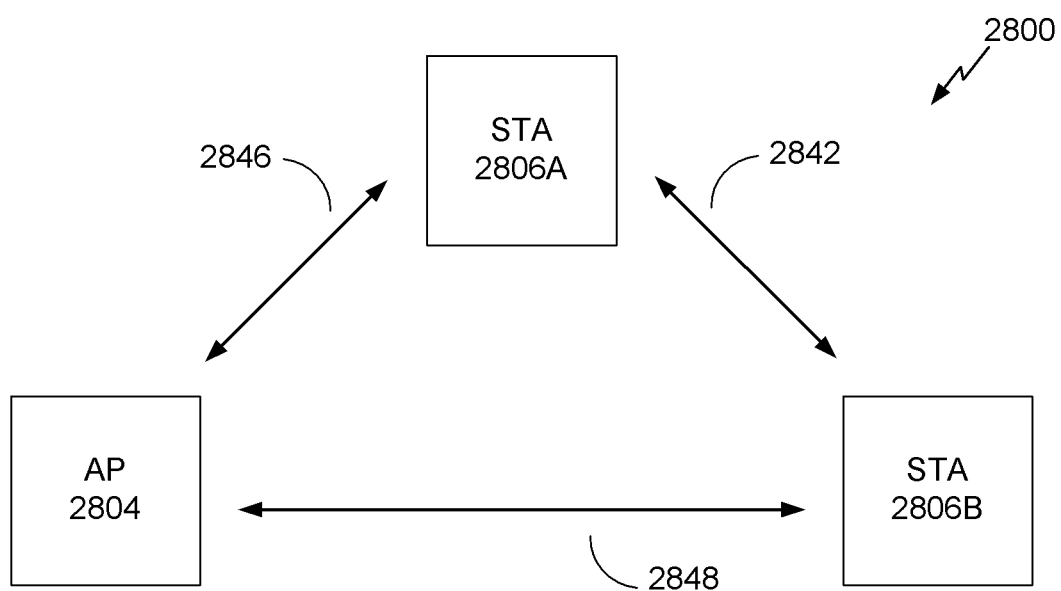
FIG. 28 illustrates a wireless communication system that includes communications between one or more STAs.

FIG. 28 illustrates a wireless communication system 2800 that includes communications between one or more STAs. As illustrated in FIG. 28, the wireless communication system 2800 may include an AP 2804, a STA 2806A, and a STA 2806B. In an embodiment, STA 2806A and STA 2806B may be associated with the AP 2804. In a further embodiment, STA 2806A and STA 2806B may each be operating in the ULP mode as described above.

In an embodiment, the STA 2806A may wake up STA 2806B by transmitting a message to the AP 2804 over data link 2846. The message may include a request for the AP 2804 to send a ULP message to the STA 2806B. The AP 2804 may send the ULP message to the STA 2806B via data link 2848.

In another embodiment, the STA 2806A may wake up STA 2806B by communicating directly with the STA 2806B, for example via data link 2842. For example, the STA 2806A may transmit a ULP message directly to the STA 2806B via the data link 2842.

In some aspects, the STA 2806A may know a time during which the STA 2806B will be in the ULP mode. The STA 2806B may transmit its ULP schedule to the AP 2804 via the data link 2848. The STA 2806A may request the ULP schedule of STA 2806B from the AP 2804 via the data link 2846. In response to the request, the AP 2804 may transmit the ULP schedule of STA 2806B to the STA 2806A via the data link 2846. Accordingly, the STA 2806A may know when the STA 2806B will be in the ULP mode and transmit the ULP message via the data link 2842 at the appropriate time. Once the ULP message is transmitted, the STA 2806A may follow up with a transmission of data packets to the STA 2806B via the data link 2842. As an example, the STA 2806A may establish a TDLS connection with the STA 2806B for the transmission of data.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A wireless station for wireless communication, comprising:
   a primary receiver;
   a low-power receiver;
   a processing circuit in communication with the primary receiver and the low-power receiver; and
   a wake-up circuit in communication with the primary receiver, the low-power receiver, and the processing circuit,
   wherein:
      the primary receiver is configured to receive a target-ultra-low-power-beacon-transmission (TUBT) message from an access point while the primary receiver is in an awake state;
      the processing circuit is configured to process the TUBT message transmitted to the wireless station from the access point, the TUBT message indicating a target wake up time when an ultra-low-power (ULP) message is expected to be received from the access point;
      the wake-up circuit is configured to:
         transition the primary receiver to a doze state subsequent to reception of the TUBT message by the primary receiver, and
         transition the low-power receiver to the awake state from the doze state based on the target wake up time indicated in the TUBT message,
      the low-power receiver is configured to receive the ULP message from the access point at the target wake up time indicated in the TUBT message;
      the wake-up circuit is further configured to, in response to reception of the ULP message by the low-power receiver:
         transition the primary receiver to the awake state from the doze state, and
         transition the low-power receiver to the doze state from the awake state,
      the primary receiver is further configured to receive at least one of a beacon or a buffer unit from the access point while in the awake state.

2. The wireless station of claim 1, wherein the wake-up circuit is configured to transition the primary receiver to the awake state at a specified time subsequent to reception of the ULP message by the low-power receiver and prior to receiving at least one of the beacon or the buffer unit from the access point.

3. The wireless station of claim 2, wherein the time corresponds to a predetermined next target beacon transit time at which the access point will transmit a beacon to the wireless station.

4. The wireless station of claim 3, further comprising a transmitter configured to transmit a power save poll frame to the access point at the time, wherein the power save poll frame indicates that the wireless station is awake and ready to receive downlink data.

5. The wireless station of claim 1, further comprising a transmitter configured to transmit an acknowledgement that the low-power receiver has received the ULP message.

6. The wireless station of claim 1, further comprising a transmitter configured to transmit a power save poll frame to the access point, wherein the power save poll frame indicates that the wireless station is awake and ready to receive downlink data.

7. The wireless station of claim 1, wherein the low-power receiver consumes less power in the awake state than the power consumed by the primary receiver in the awake state.

8. The wireless station of claim 1, wherein:
   the low-power receiver is further configured to receive a deactivate signal from the access point; and
   the wake-up circuit is further configured to deactivate the primary receiver in response to reception of the deactivate signal with the low-power receiver.

9. A method for wireless communication by a wireless station, the method comprising:
   receiving a target-ultra-low-power-beacon-transmission (TUBT) message from an access point by a primary receiver;
   processing the TUBT message, the TUBT message indicating a target wake up time when an ultra-low-power (ULP) message is expected to be received from the access point;
   transitioning the primary receiver to a doze state subsequent to reception of the TUBT message by the primary receiver;
   transitioning a low-power receiver to an awake state from the doze state based on the target wake up time indicated in the TUBT message;
   receiving the ULP message from the access point at the target wake up time indicated in the TUBT message by the low-power receiver;
   in response to receiving the ULP message by the low-power receiver:
      transitioning the primary receiver to the awake state from the doze state, and
      transitioning the low-power receiver to the doze state from the awake state, and
   receiving at least one of a beacon or a buffer unit from the access point by the primary receiver.

10. The method of claim 9, wherein transitioning the primary receiver to the awake state in response to reception of the ULP message by the low-power receiver comprises transitioning the primary receiver to the awake state at a time subsequent to receiving the ULP message by the low-power receiver and prior to receiving at least one of the beacon or the buffer unit by the primary receiver.

11. The method of claim 10, wherein the time corresponds to a predetermined next target beacon transit time at which the access point will transmit a beacon to the wireless station.

12. The method of claim 10, further comprising transmitting a power save poll frame to the access point at the time, wherein the power save poll frame indicates that the wireless station is available to receive downlink data.

13. The method of claim 9, further comprising transmitting an acknowledgement that the low-power receiver has received the ULP message.

14. The method of claim 9, further comprising transmitting a power save poll frame to the access point, wherein the power save poll frame indicates that the wireless station is available to receive downlink data.

15. The method of claim 9, wherein the low-power receiver consumes less power in the awake state than power consumed by the primary receiver in the awake state.

16. The method of claim 9, further comprising:
receiving a deactivate signal by the low-power receiver; and
deactivating the primary receiver.

17. A non-transitory computer-readable medium comprising code that, when executed, causes a wireless station to:
receive a target-ultra-low-power-beacon-transmission (TUBT) message from an access point by a primary receiver;
process the TUBT message, the TUBT message indicating a target wake up time when an ultra-low-power (ULP) message is expected to be received from the access point;
transition the primary receiver to a doze state subsequent to reception of the TUBT message by the primary receiver;
transition a low-power receiver to an awake state from the doze state based on the target wake up time indicated in the TUBT message;
receive the ULP message from the access point at the target wake up time indicated in the TUBT message by the low-power receiver;
in response to receiving the ULP message by the low-power receiver:
transition the primary receiver to the awake state from the doze state, and
transition the low-power receiver to the doze state from the awake state, and
receive at least one of a beacon or a buffer unit from the access point by the primary receiver.

18. The non-transitory computer-readable medium of claim 17, wherein transitioning the primary receiver to the awake state in response to reception of the ULP message by the low-power receiver comprises transitioning the primary receiver to the awake state at a time subsequent to receiving the ULP message by the low-power receiver and prior to receiving at least one of the beacon or the buffer unit by the primary receiver.

19. The non-transitory computer-readable medium of claim 18, wherein the time corresponds to a predetermined next target beacon transit time at which the access point will transmit a beacon to the wireless station.

20. The non-transitory computer-readable medium of claim 18, wherein the code, when executed, causes the wireless station to transmit a power save poll frame to the access point at the time, wherein the power save poll frame indicates that the wireless station is available to receive downlink data.

21. The non-transitory computer-readable medium of claim 17, wherein the code, when executed, causes the wireless station to transmit an acknowledgement that the low-power receiver has received the ULP message.

22. The non-transitory computer-readable medium of claim 17, wherein the code, when executed, causes the wireless station to transmit a power save poll frame to the access point, wherein the power save poll frame indicated that the wireless station is available to receive downlink data.

23. The non-transitory computer-readable medium of claim 17, wherein the low-power receiver consumes less power in the awake state than power consumed by the primary receiver in the awake state.

24. The non-transitory computer-readable medium of claim 17, wherein the code, when executed, causes the low-power receiver to receive a deactivate signal and the primary receiver to deactivate in response to the deactivate signal.

25. A wireless station for wireless communication, comprising:
means for receiving a target-ultra-low-power-beacon-transmission (TUBT) message from an access point;
means for processing the TUBT message, the TUBT message indicating a target wake up time when an ultra-low-power (ULP) message is expected to be received from the access point;
means for transitioning a primary receiver to a doze state subsequent to reception of the TUBT message;
means for transitioning a low-power receiver to an awake state from the doze state based on the target wake up time indicated in the TUBT message;
means for receiving the ULP message from the access point at the target wake up time indicated in the TUBT message;
means for, in response to receiving the ULP message:
transitioning the primary receiver to the awake state from the doze state, and
transitioning the low-power receiver to the doze state from the awake state, and
means for receiving at least one of a beacon or a buffer unit from the access point while the primary receiver is in the awake state.

26. The wireless station of claim 25, wherein:
the means for receiving the ULP message comprises the low-power receivers;
the means for receiving at least one of the beacon or the buffer unit from the access point comprises the primary receiver; and
the means for processing the TUBT message comprises a processor.

27. The wireless station of claim 26, wherein the low-power receiver consumes less power in the awake state than the power consumed by the primary receiver in the awake state.

28. The wireless station of claim 25, wherein the means for transitioning the primary receiver to the awake state is configured to transition the primary receiver to the awake state at a time subsequent to reception of the ULP message and prior to reception of at least one of the beacon or the buffer unit from the access point.

29. The wireless station of claim 28, wherein the time corresponds to a predetermined next target beacon transit time at which the access point will transmit a beacon to the wireless station.

30. The wireless station of claim 25, further comprising means for transmitting an acknowledgement that the ULP message has been received.

* * * * *